United States Patent
Buckley et al.

(10) Patent No.: US 7,668,159 B2
(45) Date of Patent: Feb. 23, 2010

(54) METHODS AND APPARATUS FOR OBTAINING VARIABLE CALL PARAMETERS SUITABLE FOR USE IN ORIGINATING A SIP CALL VIA A CIRCUIT-SWITCHED NETWORK FROM A USER EQUIPMENT DEVICE

(75) Inventors: Adrian Buckley, Tracy, CA (US); John-Luc Bakker, Flemington, NJ (US); Andrew Allen, Mundeline, IL (US)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 11/833,767
(22) Filed: Aug. 3, 2007

(65) Prior Publication Data
US 2008/0267171 A1 Oct. 30, 2008

Related U.S. Application Data

(63) Continuation-in-part of application No. 11/740,102, filed on Apr. 25, 2007.

(51) Int. Cl.
*H04L 12/66* (2006.01)
(52) U.S. Cl. .................. 370/354; 370/352; 370/353; 370/355; 370/356
(58) Field of Classification Search .............. 370/352, 370/401–405, 354, 353, 355–356; 455/445, 455/417, 456; 713/202
See application file for complete search history.

(56) References Cited
U.S. PATENT DOCUMENTS
2003/0212912 A1* 11/2003 Bajko et al. ............... 713/202
(Continued)

FOREIGN PATENT DOCUMENTS
EP       1 811 745 A1   7/2007
KR    1020060114349 A   11/2006

WO    2004068261 A2    8/2004

OTHER PUBLICATIONS

European Search Report; European Patent Office; Sep. 17, 2007; 10 pages.

(Continued)

*Primary Examiner*—Simon Sing
*Assistant Examiner*—Simon King
(74) *Attorney, Agent, or Firm*—The Danamraj Law Group, P.C.

(57) ABSTRACT

Methods and apparatus for use in processing Session Initiation Protocol (SIP) calls in a network environment which includes a circuit-switched (CS) network and an Internet Protocol (IP) multimedia subsystem (IMS) network. In one illustrative technique, a SIP Register message is sent from a mobile communication device to the IMS network for registration of the mobile device. A SIP 200 OK message is received by the mobile device from the IMS network in response to sending the SIP Register message. The SIP 200 OK message has one or more variable call parameters or a network address at which to obtain the variable call parameters. The variable call parameters may include an E.164 number which may be dynamically assigned to the mobile device by the IMS network, and/or a time or timer value which defines a time period for which the E.164 number remains assigned to the mobile device. Other information may be included such as preferred access network/technology information. The variable call parameters are stored in memory of the mobile device and utilized for processing each one of a plurality of SIP calls involving the mobile device. After registration, the mobile device may initialize a timer with the timer value, run the timer and, when processing a SIP call, cause a CS call setup message which includes the E.164 number to be sent to the IMS network for routing of the call if the timer has not yet expired. If the timer has expired, the mobile device may refrain from utilizing the deassigned E.164 number in the CS call setup message and alternatively obtain and utilize a new E.164 number or an altogether different technique for processing of the SIP call. Alternative techniques for obtaining parameters and formatting the data are also described.

39 Claims, 8 Drawing Sheets

U.S. PATENT DOCUMENTS

| | | | |
|---|---|---|---|
| 2004/0137918 A1* | 7/2004 | Varonen et al. | 455/456.2 |
| 2004/0203680 A1* | 10/2004 | Sylvain | 455/417 |
| 2005/0058125 A1* | 3/2005 | Mutikainen et al. | 370/354 |
| 2005/0195762 A1 | 9/2005 | Longoni et al. | |
| 2005/0233727 A1 | 10/2005 | Poikselka et al. | |
| 2006/0209805 A1* | 9/2006 | Mahdi et al. | 370/352 |
| 2006/0268900 A1 | 11/2006 | Larsson et al. | |
| 2007/0041367 A1 | 2/2007 | Mahdi | |
| 2007/0049281 A1* | 3/2007 | Chen et al. | 455/445 |
| 2007/0060097 A1* | 3/2007 | Edge et al. | 455/404.1 |
| 2007/0064886 A1 | 3/2007 | Chiu et al. | |
| 2007/0165612 A1 | 7/2007 | Buckley | |
| 2007/0183410 A1 | 8/2007 | Song et al. | |

OTHER PUBLICATIONS

Oxley, D. et al.; "Techniques to Support VoIP Using WAP In A 2G and GPRS In 2.5G Networks"; 5 pages, 2002.

"3GPP TSG-SA2 Meeting #55"; Busan, South Korea; Oct. 23-27, 2006; pp. 1 through 7.

3rd Generation Partnership Project; Technical Specification Group Services and System Aspects; Voice Call Continuity between CS and IMS; Stage 2 (Release 7); Aug. 2006; 41 pages.

European Search Report; European Patent Office; Jan. 2, 2008; 14 pages.

3rd Generation Partnership Project; Technical Specification Group Services and System Aspects; Voice Call Continuity (VCC) between Circuity Switched (CS) and IP Multimedia Subsystem (IMS); Stage 2 (Release 7); Jun. 2007; 36 pages.

Korean Patent Office; Notice Requesting Submission of Opinion with English Translation; Aug. 7, 2008; 11 pages.

PCT Notification of Transmittal of the International Search Report and the Written Opinion of the International Searching Authority, or the Declaration; International Searching Authority; Sep. 23, 2008; 14 pages.

European Search Report; European Patent Office; Oct. 22, 2008; 8 pages.

"Communication Management"; XP-002103158; pp. 501-565.

T. Alexiou et al. ; "The SIP ALLOCATE Method" ; SIPPING Working Group ; Feb. 2002 ; pp. 1-9.

"3rd Generation Partnership Project; Technical Specification Group Services and System Aspects; Voice Call Continuity between CS and IMS Study (Release 7)"; Global System for Mobile Communications; Dec. 2005; 153 Pages.

European Patent Office; EP Search Report for Application No. 06118838.9-1244; Jan. 23, 2007; 6 pages.

Examiner's First Report for Application No. 2007221785; Australian Government, IP Australia; Jan. 29, 2009; 2 pages.

EPO Extended European Search Report in Application No. 09154845.3; European Patent Office; Apr. 22, 2009; 6 pages.

Digital cellular telecommunications system (Phase 2+); Numbering, addressing and identification (3GPP TS 03.03 version 5.5.0 Release 1996); Global System for Mobile Communications; Sep. 2003; 22 pages.

China Office Action, Application No. 200710007388.8; Republic of China; Oct. 30, 2009; 15 pages.

* cited by examiner

US 7,668,159 B2

METHODS AND APPARATUS FOR OBTAINING VARIABLE CALL PARAMETERS SUITABLE FOR USE IN ORIGINATING A SIP CALL VIA A CIRCUIT-SWITCHED NETWORK FROM A USER EQUIPMENT DEVICE

CROSS REFERENCE TO RELATED APPLICATION

This patent application is a Continuation-In-Part (CIP) of and claims priority to a U.S. non-provisional patent application entitled "System And Method For Originating A SIP Call Via A Circuit-Switched Network From A User Equipment Device" having application No. 11/740,102 and a filing date of 25 Apr. 2007, which is hereby incorporated by reference herein.

FIELD OF THE TECHNOLOGY

The present disclosure generally relates to call routing in communications networks. More particularly, and not by way of any limitation, the present disclosure is directed to a system and method for managing call routing in a network environment including a circuit-switched (CS) network and an IP multimedia subsystem (IMS) network, wherein a CS-originated IP call (e.g. based on the Session Initiation Protocol or SIP) is to be routed using the IMS network infrastructure.

BACKGROUND

Today's advanced communication devices are capable of seamlessly operating in a packet-switched IP network domain (using, for example, wireless LAN (WLAN) or Wi-MAX networks) as well as a circuit-switched cellular network domain. To facilitate such capability, current $3^{rd}$ Generation Partnership Project (3GPP) standards specify a new, IP-based network architecture referred to as the IP multimedia subsystem (IMS) which allows a communication device (referred to as user equipment or UE) to initiate calls to both IP-only subscribers and conventional circuit-switched telephony subscribers using either one of the domains. There may arise a situation, however, where a wireless device (i.e. a UE device in 3GPP) is able to make a voice call to a called party through only the circuit-switched cellular network domain because either no packet-switched IP network is available, the available networks in the packet-switched domain do not support the Voice-over-IP (VoIP) service, or the user preference/subscriber policy prevents usage of the packet-switched domain for some or all services. In such a situation, if the called party happens to be an IP-only subscriber and is identified with a Uniform Resource Indicator (URI), the originating UE device may not be able to make the IP-based call since the UE device can effectuate only E.164 number-based calls while operating in the circuit-switched cellular network domain.

BRIEF DESCRIPTION OF THE DRAWINGS

A more complete understanding of the embodiments of the present disclosure may be had by reference to the following Detailed Description when taken in conjunction with the accompanying drawings, wherein.

DETAILED DESCRIPTION OF THE PREFERRED EMBODIMENTS

Methods and apparatus suitable for use in processing Session Initiation Protocol (SIP) calls in a network environment which includes a circuit-switched (CS) network and an Internet Protocol (IP) multimedia subsystem (IMS) network are described. In one illustrative technique, a SIP Register message is sent from a mobile communication device to the MS network for registration of the mobile device. A SIP 200 OK message is received by the mobile device from the IMS network in response to sending the SIP Register message. The SIP 200 OK message has one or more variable call parameters or a network address at which to obtain the variable call parameters. The variable call parameters may include an E.164 number which may be dynamically assigned to the mobile device by the IMS network, and/or a time or timer value which defines a time period for which the E.164 number remains assigned to the mobile device. Other information may be included such as preferred access network/technology information.

The variable call parameters are stored in memory of the mobile device and utilized for processing each one of a plurality of SIP calls involving the mobile device. After registration, the mobile device may initialize a timer with the timer value, run the timer and, when processing a SIP call, cause a CS call setup message which includes the E.164 number to be sent to the IMS network for routing of the call if the timer has not yet expired. If the timer has expired, the mobile device may refrain from utilizing the E.164 number (now desassigned due to timer expiration) in the CS call setup message and alternatively obtain and utilize a new E.164 number or an altogether different technique for processing of the SIP call. Alternative techniques for obtaining parameters and formatting the data are also described.

In one embodiment the one or more variable call parameters may be contained within one or more P-Preferred Header fields of the SIP 200 OK message. The one or more variable call parameters may be alternatively located in a body of the SIP 200 OK message and encoded in accordance with Uniform Resource Indicator (URI) format, or an Extensible Markup Language (XML) format. One characteristic of the E.164 number may be that it is possible to determine, by examination, which UE device (e.g. ME+Public User ID) was requesting the session. The E.164 number may be generated by at least one of (but not limited to) the following mechanisms: (a) dynamically assigned such that the numbers are allocated sequentially; (b) selected from the pool in a random fashion; (c) allocated from the pool in some sequential order; (d) constructed with use of an algorithm having some relationship(s) to one or more of the parameters received in a message (e.g. the SIP Register message, the SIP Invite message, etc.) from the UE device.

Figure 1:
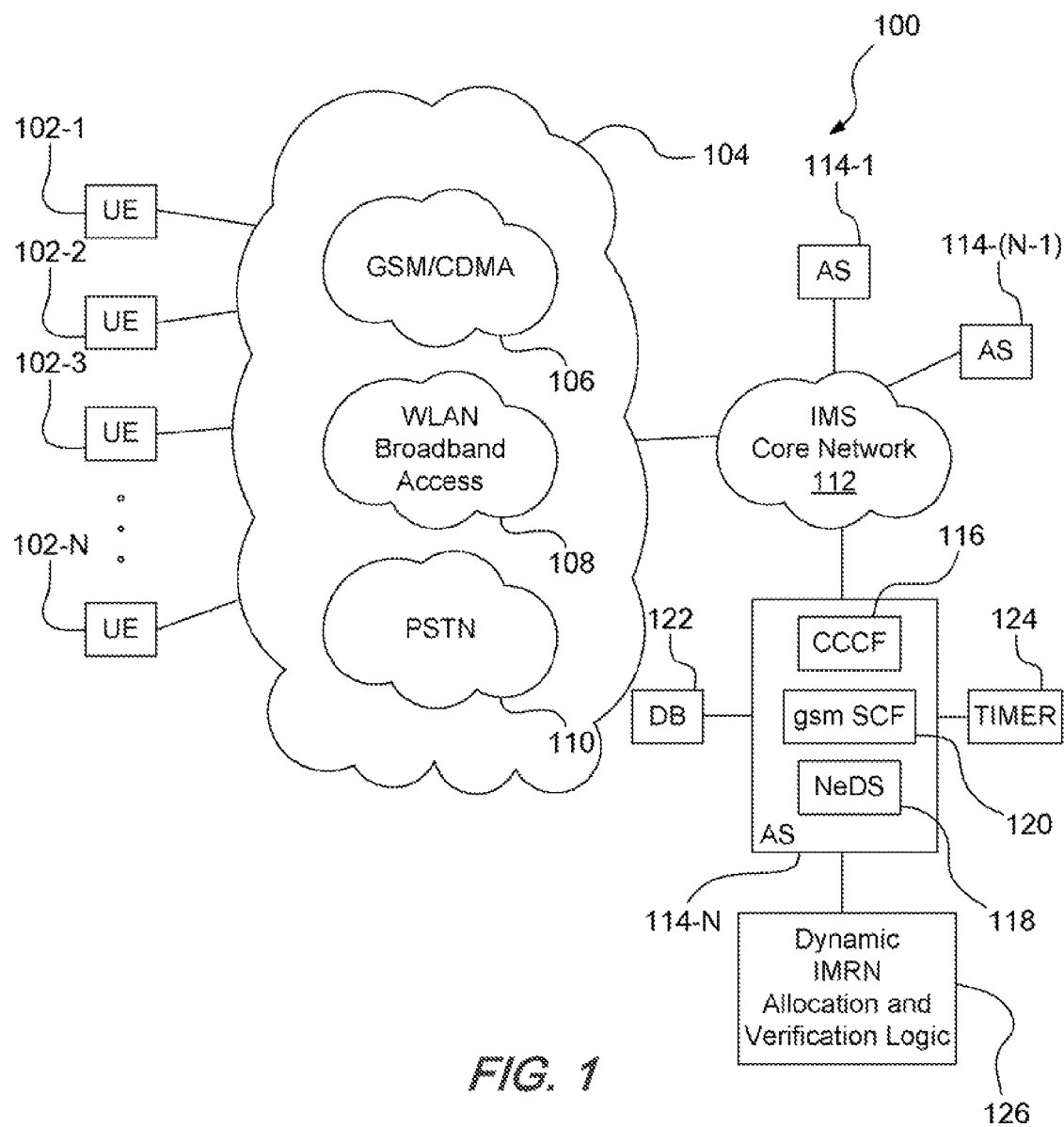
FIG. 1 depicts a network environment which includes a circuit-switched cellular network infrastructure and IP multimedia subsystem (IMS) infrastructure.

A system and method of the present disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein the techniques of the present disclosure may be practiced. As depicted, the network environment 100 includes an access space 104 comprised of a number of access technologies available to a plurality of UE devices 102-1 through 102-N. For purposes of the present disclosure, a UE device may be any tethered or untethered communications device, and may include any personal computer (e.g. desktops, laptops, palmtops, or handheld computing devices) equipped with a suitable wireless modem or a mobile communications device (e.g. cellular phones or data-enabled handheld devices capable of receiving and sending messages, web browsing, etc.), or any enhanced PDA device or integrated information appliance capable of email, video mail, Internet access, corporate data access, messaging, calendaring and scheduling, information management, and the like. Preferably, the UE device is capable of operating in multiple modes in that it can engage in both circuit-switched (CS) as well as packet-switched (PS) communications, and can transition from one mode of communications to another mode of communications without loss of continuity.

The access space 104 may be comprised of both CS and PS networks, which may involve wireless technologies, wireline technologies, broadband access technologies, etc. For example, reference numeral 106 refers to wireless technologies such as Global System for Mobile Communications (GSM) networks and Code Division Multiple Access (CDMA) networks, although it is envisaged that the teachings hereof may be extended to any 3$^{rd}$ Generation Partnership Project (3GPP)-compliant cellular network (e.g. 3GPP or 3GPP2) as well. Reference numeral 108 refers to broadband access networks including wireless local area networks or WLANs, Wi-MAX networks as well as fixed networks such as DSL, cable broadband, etc. Also exemplified as part of the access space 104 is the conventional wireline PSTN infrastructure 110.

An IP multimedia subsystem (IMS) core network 112 is coupled to the various access networks set forth above, including any CS-based networks. As is well known, the IMS standard defined by the 3GPP is designed to allow service providers manage a variety of services that can be delivered via IP over any network type, wherein IP is used to transport both bearer traffic and SIP-based signaling traffic. Broadly, IMS is a framework for managing the applications (i.e. services) and networks (i.e. access) that is capable of providing multimedia services. IMS defines an "application server" to be the network element that delivers services subscribers use, e.g. voice call continuity (VCC), Push-To-Talk (PTT), IMS Centralized Services (ICS) etc. IMS manages applications by defining common control components that each application server (AS) is required to have, e.g. subscriber profiles, IMS mobility, network access, authentication, service authorization, charging and billing, inter-operator functions, and inter-operation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present disclosure to refer collectively to both IMS and MMD where applicable.

Continuing to refer to FIG. 1, reference numerals 114-1 to 114-N refer to a plurality of AS nodes operable to support various services, e.g. VCC, PTT, ICS etc. as alluded to hereinabove. Furthermore, in order to effectuate call control of a SIP call using CS as the voice bearer, one of the AS nodes, e.g. AS 114-(N-1), may be provided for implementing functionality referred to as IMS Centralised Services Control Function (ICCF). ICCF is operable as an IMS application server element that resides in the home IMS network and tracks all call sessions and related mobile Voice-over-IP (VoIP) bearer traffic, between CS and IMS domains.

Additionally, another AS node, AS 114-N, is provided as part of the core IMS network 112 for facilitating routing of IP/SIP calls originated by one of the UE devices in the CS domain while connectivity in the PS domain is not available or the available PS networks are not capable of supporting the VoIP service (e.g. due to bandwidth limitations). Appropriate database structures (e.g. DB 122), timer mechanisms (e.g. timer 124) and suitable logic 126 may be provided in association with AS 114-N for purposes of configuring and managing a pool of IP multimedia routing numbers (IMRNs) from which a select IMRN may be dynamically-allocated or otherwise selected for purposes of SIP call routing as will be described in greater detail below. The IMRN may be alternatively referred to as an IMS Centralized Service Routing Number or "ICSRN."

In accordance with a first technique of the present disclosure, AS 114-N is preferably provided with appropriate logic/structure/software/firmware module(s), such as call continuity control function (CCCF) 116, network domain section (NeDS) 118, and gsm service capability feature (gsm SCF) 120 for performing the following: maintaining a pool of E.164 numbers that are operable as IMRNs which terminate on the AS node, wherein a select E.164 number may be mapped to the received information in the SIP Invite message, including but not limited to a called party's SIP URI or Tel URI, P-Preferred Identity, Privacy Indication, and Network Access Info header; dynamically allocating or otherwise selecting the E.164 number to a received called party's URI (e.g. SIP URI or Tel URI) and other received information; and providing the selected E.164 number to the originating UE device via a SIP 380 (Alternative Service) Response message; verifying that the selected E.164 number has not timed out when that selected E.164 number is returned (via conventional CS call setup) to AS 114-N for effectuating a SIP call session with respect to the called party; and optionally, quarantining the select E.164 number for a period of time upon releasing it back to the pool for future use.

Note that E.164 is indicative of the International Telecommunications Union (ITU) telephone numbering plan, which specifies how and by whom telephone numbers are assigned. The format and notation of E.164 telephone numbers is specified in the ITU standard E.123, for example. To manage a pool of allocable IMRNs, the AS node (e.g. AS 114-N) may be configured in a number of ways. For example, a particular E.164 number may be provided as a "starting address" number of an IMRN range. Another E.164 number may operate as a range delimiter with respect to the IMRN range. To allow flexibility, it may be desirable to provide for different pools of IMRNs to be configured from different number ranges. Further, appropriate timer mechanism(s) may be implemented at AS 114-N in order to ensure that the allocated IMRNs remain valid (e.g. they have not timed out, that is, they are used within appropriate time limits) or suitable quarantine times are applied. As will be described in detail below, management of timers associated with IMRNs at AS 114-N and timers associated with call reference numbers at the originating UE device allows for provisioning of IMRNs that could be used for effectuating SIP calls by the UE device operating in the CS domain.

Figure 2:
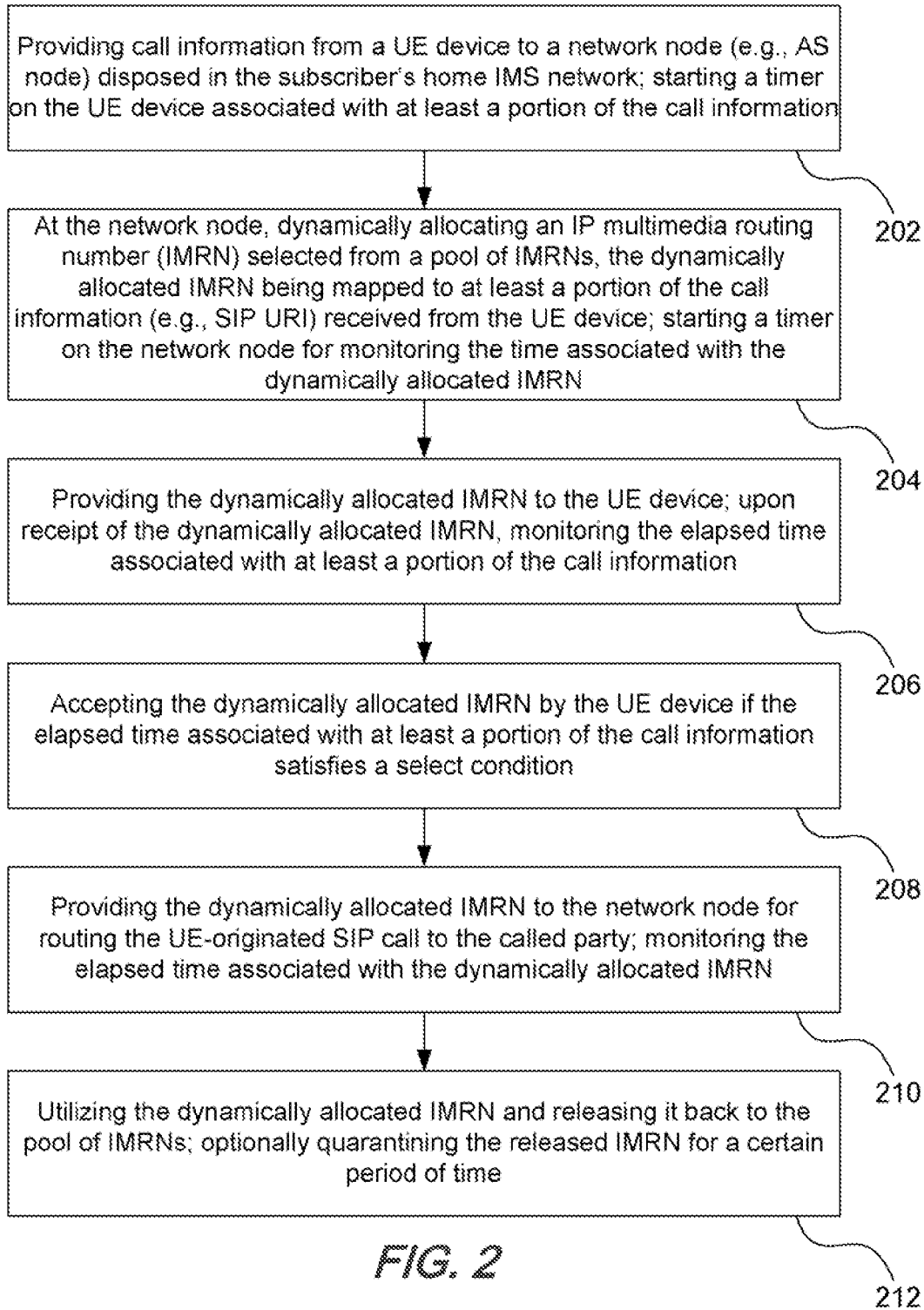
FIG. 2 is a first flowchart associated with a first technique of obtaining, providing, and/or utilizing a variable call parameter suitable for use in originating a SIP call, where the variable call parameter may be obtained, provided, and/or utilized on a call-by-call basis.

FIG. 2 depicts a flowchart of an exemplary embodiment of an overall methodology of the first technique of the present disclosure for effectuating a CS-originated SIP call by a UE device with respect to a called party identified by a URI (e.g. a SIP URI or Tel URI). The SIP call is initiated by the end user of the UE device, or the originating party. Preferably, the originating party either enters the URI via a suitable interface (e.g. MMI) or selects it from a list stored in the UE. As is well known, a typical SIP address may take on the form of sip: <username>@<hostname>, which may include additional syntax elements and parameters such as those described in, e.g. RFC 3261 entitled: *SIP: Session Initiation Protocol* and Internet Draft entitled *Obtaining and Using Globally Routable User Agent (UA) URIs (GRUU) in the Session Initiation Protocol (SIP)* (draft-ietf-sip-gruu-06) (Expires: Apr. 23, 2006).

Note that a "Tel URI" is presently defined in Request For Comments (RFC) 3966 (Dec. 2004). Some examples of Tel URIs are as follows: (1) tel:+1-201-555-0123: This URI points to a phone number in the United States. The hyphens are included to make the number more human readable; they separate country, area code and subscriber number; (2) tel: 7042;phone-context=example.com: The URI describes a local phone number valid within the context "example.com"; and (3) tel:863-1234;phone-context=+1-914-555: The URI describes a local phone number that is valid within a particular phone prefix.

At block 202, various pieces of information relating to the SIP call (which may be collectively referred to as "call information" herein). The call information may include information such as a call reference number associated with the call, called party's SIP URI (or, the B-URI), Opaque parameter (if available), GRID parameter (if available), additional URI-related information (e.g. display name), calling party's SIP URI (or, the A-URI), Opaque parameter, privacy indicator, network access info header etc. If the calling party sends a B-URI that comprises an Address of Record (AOR) as well as Opaque and GRID parameters, they will be provided as part of the call information. Additionally, if the calling party sends its own URI comprising AOR, Opaque and GRID parameters, they will also be provided in the call information.

A timer may be initiated on the UE device that is used for monitoring at least a portion of the call information that is transmitted by the originating UE device as described above. In particular, the timer may be implemented for monitoring the elapsed time since a particular call reference number is generated and forwarded to the IMS network node. At the IMS network node, an IMRN selected from the pool of IMRNs is associated with the call reference number (at least a portion of the call information), e.g. the received called party's SIP URI (block 204). In some embodiments, the IMRN may be mapped to all the received SIP call information. Also, a timer may be started at the network node for monitoring a time-to-live variable associated with the selected IMRN.

Thereafter, the selected IMRN is provided to the UE device via a SIP 380 (Alternative Service) Response message. Upon receipt of the SIP 380 (Alternative Service) Response message which includes the selected IMRN at the UE device, the elapsed time associated with the call reference number is monitored to ensure that it is not stale (block 206). The selected IMRN is accepted by the UE device if the time elapsed satisfies a select condition, e.g. within a time-to-live value (block 208). In response, appropriate call setup is then initiated by the UE device using the selected IMRN, whereby the accepted IMRN is returned to the AS node since it terminates thereat. Upon receipt of the IMRN at the AS node, its time-to-live variable is monitored to ensure that it has not timed out (block 210). Thereafter, the called party's SIP URI or Tel URI (and any other suitable SIP information originally received that is mapped to the selected IMRN) is utilized by the AS node for effectuating the SIP session with the called party by producing and sending a SIP Invite message (e.g. inserting the A-party URI, Privacy indicator, B-party URI, Opaque parameter, etc., in the SIP Invite message and causing it to be sent to the called party). In one implementation, the selected IMRN may optionally be returned back to the pool of IMRNs, wherein it may be quarantined for a certain period of time before it is reused or becomes available for future use (block 212).

Based on the foregoing, those skilled in the art will appreciate that when the call information, i.e. called party's SIP URI or Tel URI, call reference number, etc. is sent by the UE device to the serving AS node, appropriate logic at the AS node may create a record that maps the received call information to an E.164-based IMRN, which is transmitted back to the UE device. Upon correlating the IMRN with the call reference number, the UE sets up a call using the IMRN that terminates on the AS node. The IMRN is then interrogated against the record to retrieve the called party's URI for establishing a SIP session with the called party (i.e. between the calling party (UE device) identified by the A-party address and the called party identified by the B-party address).

It should be further recognized by those skilled in the art that the message flow between the UE device and the home IMS network's AS node may be mediated through a number of other appropriate network infrastructure elements, and may be implemented in a number of ways depending on the device capabilities as well as the network features and protocols being used. Typically, the message flow may be mediated via network elements such as a mobile switching center (MSC) and a media gateway control function (MGCF) element disposed between the UE device and its home IMS AS node operable to facilitate CS-originated SIP calls.

Figure 3A:
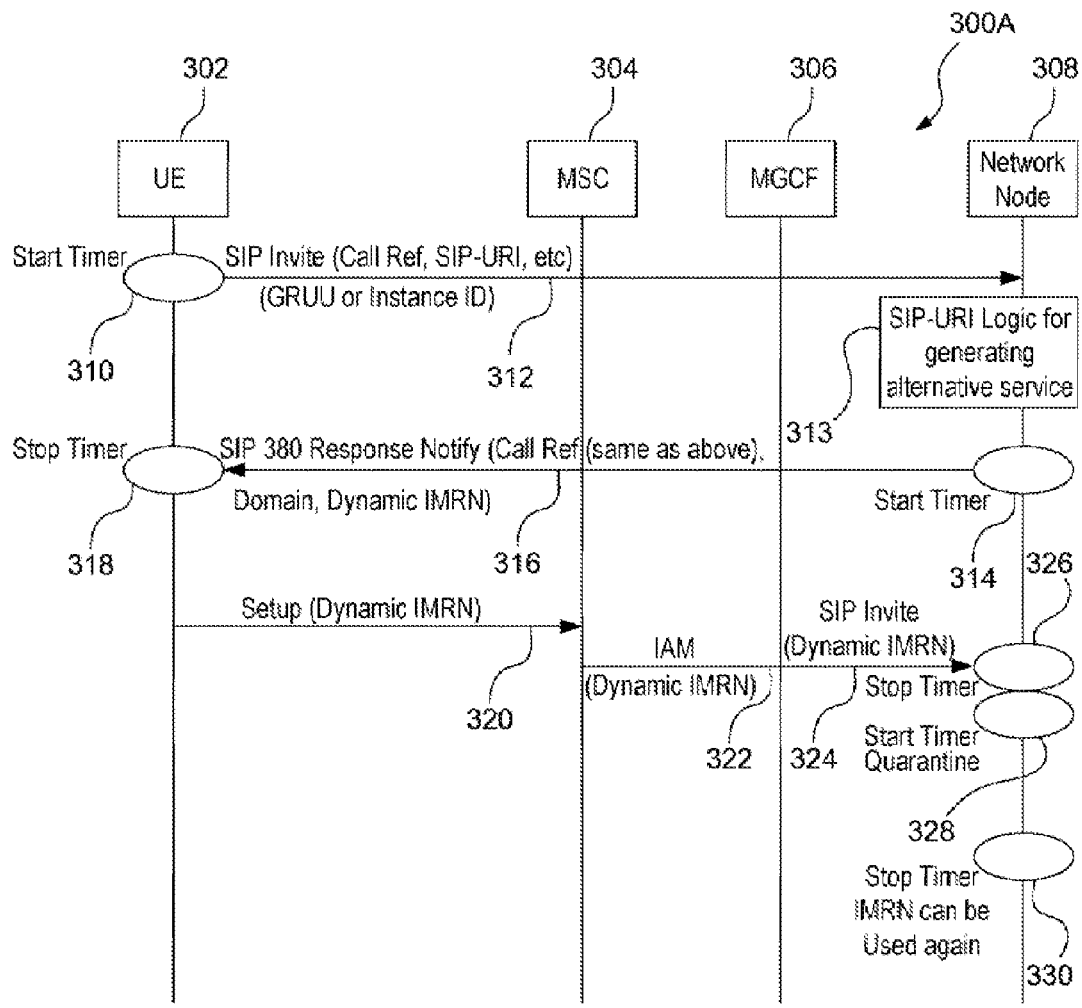
FIGS. 3A and 3B depict exemplary message flow diagrams corresponding to the first technique of FIG. 2, for use in originating a SIP call by employing a SIP Invite message with a SIP-URI of the called party in the Request-URI, for mapping with a selected IP multimedia routing number (IMRN) at an application server (AS) node which is utilized.

FIG. 3A depicts a message flow embodiment 300A for effectuating a CS-originated SIP call in accordance with the first technique which is based on IMRN allocation where SIP messaging is implemented. A wireless UE device 302 having the CS domain and IMS domain modes of functionality is operable to generate a SIP Invite message 312 towards an application server (AS) node 308 in response to detecting that a SIP call is being initiated from UE device 302 in the CS domain. As described earlier, the SIP Invite message 312 includes applicable call information such as call reference number, called party's SIP URI, additional URI information, and the like, e.g. A-party AOR in the P-Preferred-Identity, Privacy Indicator Opaque parameter, GRID parameter, etc.

As described above, the originating party either enters the URI (or SIP address) or Tel URI via a suitable interface (e.g. MMI) or selects it from a list stored in the UE to initiate the call.

The SIP Invite message 312 may further include an indicator in an indicator field that indicates whether the message is for a circuit-switched (CS) mobile-originated (MO) call (i.e. whether UE device 302 intends to make this call via CS domain). For example, a new Network-Access-Info value such as "GERAN-CS" may be utilized. Alternatively, a new feature tag or new URI parameter may be provided in the SIP Invite message. Note, however, that an indication may be assumed merely from the inclusion of the SIP URI or Tel URI of the called party ("B-party") in the SIP Invite message. In one preferred embodiment, the TARGET address in the SIP Invite message is populated with the SIP URI or Tel URI of the called party or B-party. In this case, a SIP URI field of the SIP Invite message is populated with a public service identifier (PSI) of the AS node. A cause value in the SIP Invite message will be set appropriately to indicate that a radio bearer channel for the session is to be established over the CS domain.

A suitable timer mechanism 310 may be initiated at the UE device in order to monitor a time-to-live variable associated with the call reference number. It should be appreciated that this timer may be provided in addition to normal SIP timers as this operation is known to provide a SIP 380 Response with specific information within a certain timeframe.

Responsive to the Invite message 312, which may be mediated via I-CSCF and/or S-CSCF nodes, AS node 308 disposed in the user's home IMS network is operable to launch SIP-URI logic 313 for generating and populating a suitable SIP 380 (Alternative Service) Response message (e.g. SIP 380 Response message) as described above. Upon verifying that the user is allowed to do a SIP call and the Invite message includes the proper CS MO indicator, the network node (in this example, the IMS AS node) dynamically allocates or otherwise identifies a selected IMRN mapped to the call information or parameters (e.g. A-party AOR in the P-Preferred-Identify, Privacy Indicator Opaque parameter, GRID parameter, etc.) and returns it back to UE device 302 via SIP 380 message 316. The dialog information contained in the Invite Header or in the body of the Invite may be used to correlate the call.

A suitable timer mechanism may be started (block 314) at the AS node 308 in order to monitor a time-to-live variable associated with the selected IMRN. After verifying that the call reference has not timed out based on the UE device's timer mechanism, responsive to receipt of the SIP 380 Response message 316, UE device 302 initiates a call setup message 320 that includes the selected IMRN. In response, MSC 304 generates an Initial Address Message (IAM) 322 towards MGCF 306. A SIP Invite message 324 that contains the IMRN is generated by MGCF 306 towards the AS node 308, which then uses the IMRN mapping for establishing the SIP session or call to the called party (not shown). It is recognized that various intermediate SIP messages and resource allocation/reservation negotiations may take place between MGCF 306 and the called party subsequent to SIP Invite 324, which are not described in particular detail herein. Also, additional ISUP messaging that may take place before a bearer path is established between the UE device 302 and the called party understood by those skilled in the art is not shown herein.

Upon receipt of the selected IMRN via SIP Invite 324 at the AS node 308, the timer mechanism may be stopped (block 326) to verify if the IMRN has timed out. If timed-out, the SIP Invite message may be discarded and the call routing process may be terminated. If the IMRN has not timed out, the AS node 308 may establish the SIP session based on the IMRN correlation. After using the IMRN for correlation, it may be returned to the IMRN pool, wherein a quarantine timer may be started (block 328) such that the IMRN is prohibited from further use until the quarantine timer is stopped after a period of time (block 330).

As pointed out previously, the timer mechanism at the device side may also be used to ensure that the call reference number has not timed out (e.g. using the timer mechanism 318), which reference number is used by the UE device to correlate the information received from the network node (e.g. the selected IMRN). If the timer expires before the same reference number is received back from the network node, the UE device may reattempt the call process a predetermined number of times (e.g. five attempts), after which if no response has been received, the call procedure may be deemed to have failed. In other words, if the UE device receives a reference number that is no longer valid, it may be discarded and the call procedure may be terminated.

Figure 3B:
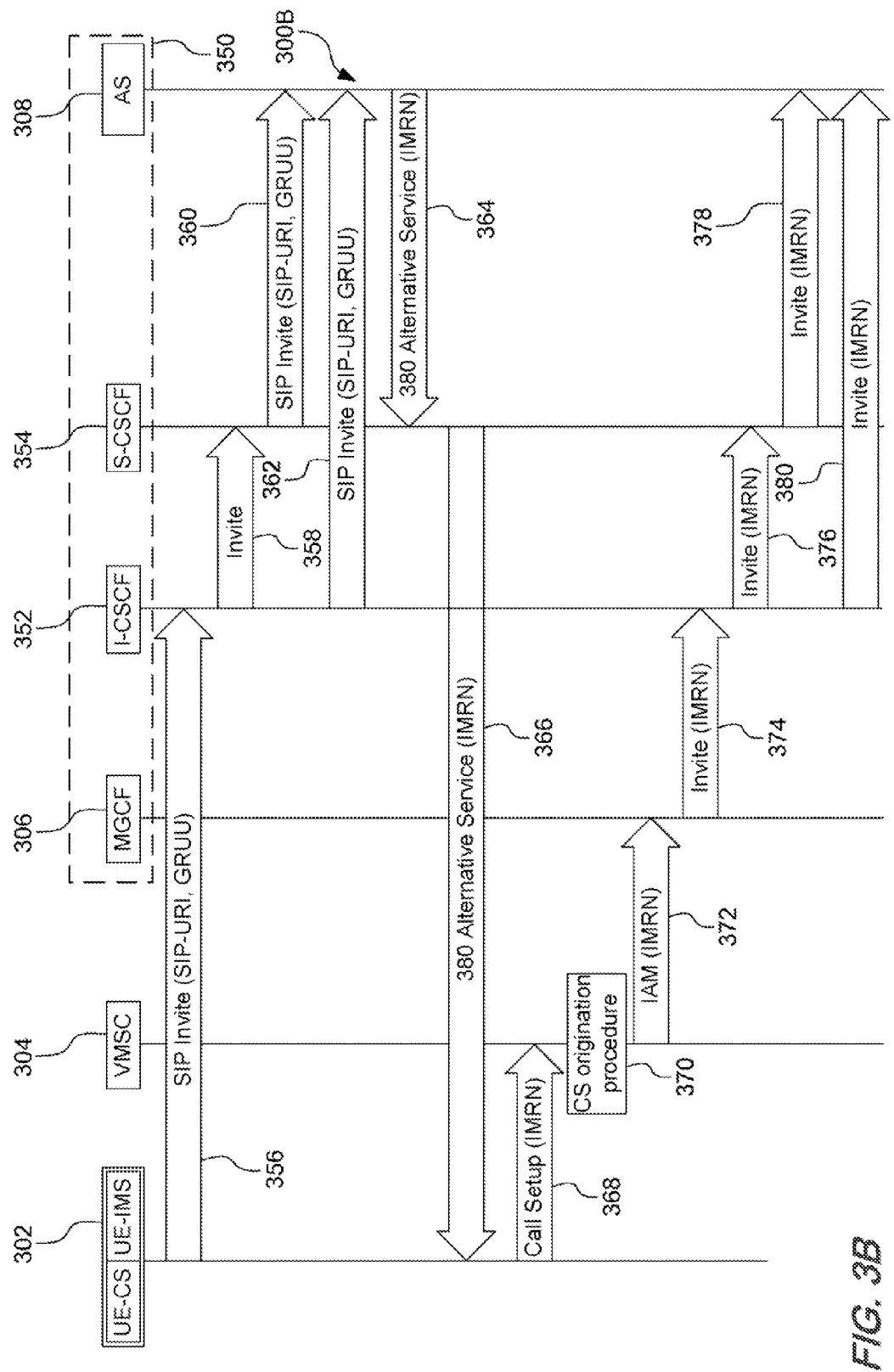

In further describing the first technique of the present disclosure, FIG. 3B depicts a message flow diagram 300B for a mobile-originated SIP call by employing a SIP Invite message with a SIP-URI in the Request-URI, wherein certain intermediary nodes in a home network 350 are exemplified. Similar to the flow diagram embodiment 300A described above, UE device 302 is operable to generate a SIP Invite message 356 towards I-CSCF 352, wherein the SIP Invite message includes a SIP-URI of the called party contained in the TARGET field. This Invite message is propagated to AS node 308 either directly as SIP Invite 362 or via S-CSCF 354 by way of SIP Invite messages 358 and 360. As described previously, SIP 380 (Alternative Service) Response message 364 having the IMRN is generated by AS node 308 towards S-CSCF 354, which is then propagated to UE device 302 via SIP response 366. A call setup message 368 having the IMRN is provided to MSC 304, which initiates a CS origination procedure 370. IAM messaging 372 from MSC 304 towards MGCF 306 is operable to generate SIP Invite 374 towards I-CSCF 352, which may be directly propagated to AS node 308 as Invite message 380 having the IMRN. Alternatively, I-CSCF 352 first provides a SIP Invite 376 to S-CSCF 354 which then propagates a SIP Invite 378 to AS node 308. Regardless, once the IMRN is received at the AS node 308, appropriate call correlation is made to establish the SIP call between the UE and the called party.

Note that, in one variation of the technique described in relation to FIGS. 2, 3A, and 3B, the E.164 number is not dynamically-allocated but rather merely identified, calculated, or otherwise selected in accordance with any suitable algorithm.

Elaborating on the techniques of the present disclosure in further detail, when the UE device detects that it needs to invoke CS call origination, it may produce and send a SIP Invite message to an R-URI that is known to terminate at the IMS centralized services node. In this case, the Target parameter of the SIP Invite message is populated with the B party address (SIP URI or Tel URI) and the Cause value of the SIP Invite message is set to indicate that the call needs to be set up over CS. Alternatively, the R-URI may be populated with the B-party address, and may further include an indicator in an indicator field that indicates whether the message is for a circuit-switched (CS) mobile-originated (MO) call (i.e. whether UE device 302 intends to make this call via the CS domain). For example, a new Network-Access-Info value such as "GERAN-CS" may be utilized. Alternatively, a new feature tag or new URI parameter may be provided in the SIP Invite message. In the first case, the SIP Invite message contains the GRUU of the UE/Public ID combination. The P-Preferred-ID is set to the calling line identity (CLI) associated with the user or subscriber of the UE device for identification in the CS network. The B-Party Public user address (Tel URI, SIP URI) is set in SIP URI Target parameter, and the cause value indicates CS bearer required=YYY.

Note that when the Target parameter is used to carry the B party address, the SIP R-URI may be one of many that have been provisioned in the UE device to indicate the ICCF. If so, the UE device could choose one of these at random, the URI could have some indice that identifies a priority order.

An example is provided below:

```
INVITE sip:icenetworknode@example.com;\
    target=sip:+15555551002%40example.com;user=phone;\
    cause=YYY SIP/2.0
P-Preferred-Identity: <tel: +1-555-1001>
P-Access-Network-Info: 3GPP-GERAN;
Privacy: none
From:Alice <sip:+15551001@example.com;user=phone>;tag=9fxced76sl
    Supported: gruu
    To: sip:+15555551002@example.com;user=phone
    Call-ID: c3x842276298220188511
    CSeq: 1 INVITE
    Max-Forwards: 70
    Contact: <sip:alice@192.0.2.1>
    ;+sip.instance="<urn:uuid:f81d4fae-7dec-11d0-a765-00a0c91e6bf6>"
    Content-Type: application/sdp
    Content-Length: *Body length goes here*
```

If the R-URI is set to the B-party, the invite shall contain the GRUU of the UE/Public ID combination. The P-Preferred-ID shall be set to the calling line identity that the user wants to be known as in the CS network. The Network-Access-Info header shall be set to a value to indicate that the call is SIP controlled, but the radio bearer goes over the CS domain, in this example the setting is 3GPP-GERAN-CS, another example could be 3GPP-UTRAN-CS.

An example is provided below:

```
INVITE sip: sip:+15555551002%40example.com;user=phone;\
    SIP/2.0
P-Preferred-Identity: <tel: +1-555-1001>
P-Access-Network-Info: 3GPP-GERAN-CS;
Privacy: none
From:Alice
<sip:+15551001@example.com;user=phone>;tag=9fxced76sl
    Supported: gruu
    To: sip:+15555551002@example.com;user=phone
    Call-ID: c3x842276298220188511
    CSeq: 1 INVITE
    Max-Forwards: 70
    Contact: <sip:alice@192.0.2.1>
    ;+sip.instance="<urn:uuid:f81d4fae-7dec-11d0-a765-00a0c91e6bf6>"
    Content-Type: application/sdp
    Content-Length: *Body length goes here*
```

Upon receipt of a 380 (Alternative Service) response to the SIP Invite message, the UE shall use the IMRN that was provided in the 380 (Alternative Service) Response as the E.164 number to set up a CS call to. This E.164 number shall be in the contact header of the 380 (Alternative Service) or in fact it could be in the XML body.

Upon receipt of the R-URI, the S-SCSF recognizes that the Invite is for the IMS centralized services node that has been assigned to the UE, and forwards it to this AS node. IMS centralized service node configuration information includes (a) the IMRN start address number; and (b) number of IMRNs to be allocated or the last IMRN start address number. To allow for flexibility in numbering plan, there may be more occurrences of (a) and (b) allowing pools of IMRNs to be allocated from different number ranges. In addition to (a) and (b), other configuration information may include (c) life time an IMRN can live for; and (d) quarantine time of an IMRN—how long after an IMRN has been assigned back to the IMRN pool it cannot be used for.

Behavior at the IMS centralized service node is discussed. If the IMS centralized services node receives an Invite that contains an R-URI it shall examine that R-URI to determine if that R-URI is associated with a request to initiate a MO call over CS. An alternative implementation is that the IMS centralized services node examines the P-Access-Network-Info header. If it is set to GERAN-CS or some other value to indicate call-set-up over CS, the IMS centralized services node shall assume the received Invite shall be terminated here and the behavior as follows shall take place.

The IMS centralized services node will assign an IMRN to the received GRUU. The following represents a possible mapping of the IMRN to the other information elements.

```
IMRN --
    GRUU
    P-Asserted ID(s)
    B-Number (SIP URI or Tel URI)
```

The IMS centralized services node will respond to the INVITE request with a 380 (Alternative Service) response. An example of coding of this response can be found below, which shall include the IMRN, the Radio Access type that the handover shall be made to that includes (but is not limited to) "IEEE-802.11"/"IEEE-802.11a"/"IEEE-802.11b"/"IEEE-802.11g"/"3GPP-GERAN"/"3GPP-UTRAN-FDD"/"3GPP-UTRAN-TDD"/"ADSL"/"ADSL2"/"ADSL2+"/"RADSL"/"SDSL"/"HDSL"/"HDSL2"/"G.SHDSL"/"VDSL"/"IDSL"/"3GPP2-1X"/"3GPP2-1X-HRPD"/"DOCSIS"/token, 3GPP-GERAN CS, 3GPP-GERAN PS, 3GPP-UTRAN CS, 3GPP-UTRAN PS, 802.11b, 802.11a, 802.11g, EVDO, CDMA1X , WiMAX, etc. The IMRN is also contained in the Contact Header. It will start a timer against the allocation of the IMRN that will be cancelled on receipt of an Invite that origination was from a MGCF with the IMRN as the R-URI. If the timer expires the IMRN shall be put into a quarantine pool.

If the IMS centralized services node receives a subsequent request from the same UE, identified by the GRUU in the Invite, the IMS centralized services node may do the following: (a) Resend the same IMRN and reset the timer; (b) Allocate a new IMRN, start a timer associated with that IMRN and the old put into the quarantine pool; and (c) Reject the request altogether and the old put into the quarantine pool.

The following is exemplary code and XML schema for coding a 380 Alternative Service Response:

```
<!ELEMENT IMRN #(PCDATA)>
<!ATTLIST IMRN
    TYPE (SIP_URI | Tel_URI) #REQUIRED
>
OR
```

```
<!ELEMENT RAT EMPTY>
<!ATTLIST RAT
  TYPE (IEEE-802.11 | IEEE-802.11a | IEEE-802.11b | IEEE-802.11g |
3GPP-GERAN | 3GPP-UTRAN-FDD | 3GPP-UTRAN-TDD | ADSL |
ADSL2 | ADSL2plus | RADSL | SDSL | HDSL | HDSL2 |
G.SHDSL | VDSL | IDSL | 3GPP2-1X | 3GPP2-1X-HRPD |
DOCSIS | 3GPP-GERAN-CS | 3GPP-GERAN-PS
| 3GPP-UTRAN-CS | 3GPP-UTRAN-PS | EVDO | CDMA1X | WiMAX)
#REQUIRED
>
OR
<!ELEMENT AT EMPTY>
<!ATTLIST AT
  TYPE (IEEE-802.11 | IEEE-802.11a | IEEE-802.11b | IEEE-802.11g |
3GPP-GERAN | 3GPP-UTRAN-FDD | 3GPP-UTRAN-TDD | ADSL |
ADSL2 | ADSL2plus | RADSL | SDSL | HDSL | HDSL2 |
G.SHDSL | VDSL | IDSL | 3GPP2-1X | 3GPP2-1X-HRPD |
DOCSIS | 3GPP-GERAN-CS | 3GPP-GERAN-PS
| 3GPP-UTRAN-CS | 3GPP-UTRAN-PS | EVDO | CDMA1X | WiMAX)
#REQUIRED
>
OR
<?xml version="1.0" ?>
<!-- Draft DTD for the IMS XML body. -->
<!DOCTYPE ims-3gpp [
    <!-- ims-3gpp element: root element -->
    <!ELEMENT ims-3gpp (alternative-service?, service-info?)>
    <!ATTLIST ims-3gpp version CDATA #REQUIRED>
    <!-- service-info element: The transparent data received
from HSS for AS -->
    <!ELEMENT service-info           (#PCDATA)>
    <!-- alternative-service: alternative-service used in
emergency sessions -->
    <!ELEMENT alternative-service   (type, action, ics-mo-
address, reason)>
    <!ELEMENT type                  (emergency | MO-
call)>
    <!ELEMENT reason                (#PCDATA)>
<!ELEMENT ics-mo-address (uri, access-type?, domain-type?)>
<!ELEMENT uri (#PCDATA)>
<!ELEMENT action                (emergency-registration)>
<!ELEMENT access-type EMPTY>
<!ATTLIST access-type
  access-technology (IEEE-802.11 | IEEE-802.11a | IEEE-802.11b |
IEEE-802.11g | 3GPP-GERAN | 3GPP-UTRAN-FDD |
3GPP-UTRAN-TDD | ADSL | ADSL2 | ADSL2plus | RADSL |
SDSL | HDSL | HDSL2 | G.SHDSL | VDSL | IDSL |
3GPP2-1X | 3GPP2-1X-HRPD | DOCSIS | 3GPP-GERAN-CS
| 3GPP-GERAN-PS | 3GPP-UTRAN-CS | 3GPP-UTRAN-PS | EVDO |
CDMA1X | WiMAX) #REQUIRED
>
<!ELEMENT domain-type EMPTY>
<!ATTLIST domain-type
  domain (PS | CS) #IMPLIED
>
]>
OR
<ics-mo-address>
  <uri>tel:ffff</uri>
  <access-type access-technology="3GPP-GERAN"/>
  <domain-type domain="PS"/>
</ics-mo-address>
OR
<?xml version="1.0" encoding="UTF-8"?>
<xs:schema xmlns:xs="http://www.w3.org/2001/XMLSchema"
elementFormDefault="qualified"
attributeFormDefault="unqualified">
    <xs:complexType name="tIMS3GPP">
        <xs:choice>
            <xs:element name="alternative-service"
type="tAlternativeService"/>
            <xs:element name="service-info"
type="xs:string"/>
        </xs:choice>
    </xs:complexType>
    <xs:complexType name="tAlternativeService">
        <xs:sequence>
            <xs:element name="type" type="tType"
minOccurs="0"/>
            <xs:element name="action" type="tAction"
minOccurs="0"/>
            <xs:element name="reason" type="xs:string"/>
        </xs:sequence>
    </xs:complexType>
    <xs:simpleType name="tType">
        <xs:restriction base="xs:string">
            <xs:enumeration value="emergency"/>
        </xs:restriction>
    </xs:simpleType>
    <xs:complexType name="tAction">
        <xs:choice>
            <xs:element name="ics-mo-address"
<type="tICSMOAddress" minOccurs="0"/>
            <xs:element name="emergency-registration"
minOccurs="0">
                <xs:complexType/>
            </xs:element>
        </xs:choice>
    </xs:complexType>
    <xs:complexType name="tICSMOAddress">
        <xs:choice>
            <xs:group ref="gAccesses"/>
            <xs:element name="other_access" minOccurs="0">
                <xs:complexType/>
            </xs:element>
        </xs:choice>
        <xs:attribute name="MO-address" type="xs:anyURI"
use="required"/>
    </xs:complexType>
    <xs:group name="gAccesses">
        <xs:sequence>
            <xs:element name="cs" type="tCS" minOccurs="0"
maxOccurs="unbounded"/>
            <xs:element name="ps" type="tPS" minOccurs="0"
maxOccurs="unbounded"/>
        </xs:sequence>
    </xs:group>
    <xs:complexType name="tPS">
        <xs:simpleContent>
            <xs:extension base="tPSAccessList"/>
        </xs:simpleContent>
    </xs:complexType>
    <xs:simpleType name="tPSAccessList">
        <xs:list itemType="tPSAccess"/>
    </xs:simpleType>
    <xs:simpleType name="tPSAccess">
        <xs:restriction base="xs:string">
            <xs:enumeration value="IEEE-802.11"/>
            <xs:enumeration value="IEEE-802.11a"/>
            <xs:enumeration value="IEEE-802.11b"/>
            <xs:enumeration value="IEEE-802.11g"/>
            <xs:enumeration value="IEEE-802.11n"/>
            <xs:enumeration value="3GPP-GERAN"/>
            <xs:enumeration value="3GPP-UTRAN-FDD"/>
            <xs:enumeration value="3GPP-UTRAN-TDD"/>
            <xs:enumeration value="ADSL"/>
            <xs:enumeration value="ADSL2"/>
            <xs:enumeration value="ADSL2+"/>
            <xs:enumeration value="RADSL"/>
            <xs:enumeration value="SDSL"/>
            <xs:enumeration value="HDSL"/>
            <xs:enumeration value="HDSL2"/>
            <xs:enumeration value="G.SHDSL"/>
            <xs:enumeration value="VDSL"/>
            <xs:enumeration value="IDSL"/>
            <xs:enumeration value="3GPP2-1X"/>
            <xs:enumeration value="3GPP2-1X-HRPD"/>
            <xs:enumeration value="DOCSIS"/>
            <xs:enumeration value="3GPP-UTRAN"/>
            <xs:enumeration value="EVDO"/>
            <xs:enumeration value="CDMA1X"/>
            <xs:enumeration value="WiMAX"/>
            <xs:enumeration value="other"/>
        </xs:restriction>
    </xs:simpleType>
    <xs:complexType name="tCS">
        <xs:simpleContent>
            <xs:extension base="tCSAccessList"/>
```

-continued

```
          </xs:simpleContent>
       </xs:complexType>
       <xs:simpleType name="tCSAccessList">
          <xs:list itemType="tCSAccess"/>
       </xs:simpleType>
       <xs:simpleType name="tCSAccess">
          <xs:restriction base="xs:string">
             <xs:enumeration value="3GPP-GERAN"/>
             <xs:enumeration value="3GPP-UTRAN"/>
             <xs: enumeration value="D"/> <!-- pre-cdma2000 (i.e.
TIA-95-B or before) -->
             <xs:enumeration value="1x"/> <!-- TIA-2000 CS
voice, but no packet data available -->
             <xs:enumeration value="1X"/> <!-- TIA-2000 CS
voice and packet data available -->
             <xs:enumeration value="1XEV"/> <!-- TIA-856
packet data + TIA-2000 CS voice -->
             <xs:enumeration value="other"/>
          </xs:restriction>
       </xs:simpleType>
       <xs:element name="ims-3gpp" type="tIMS3GPP"/>
</xs:schema>
```

Figure 4:
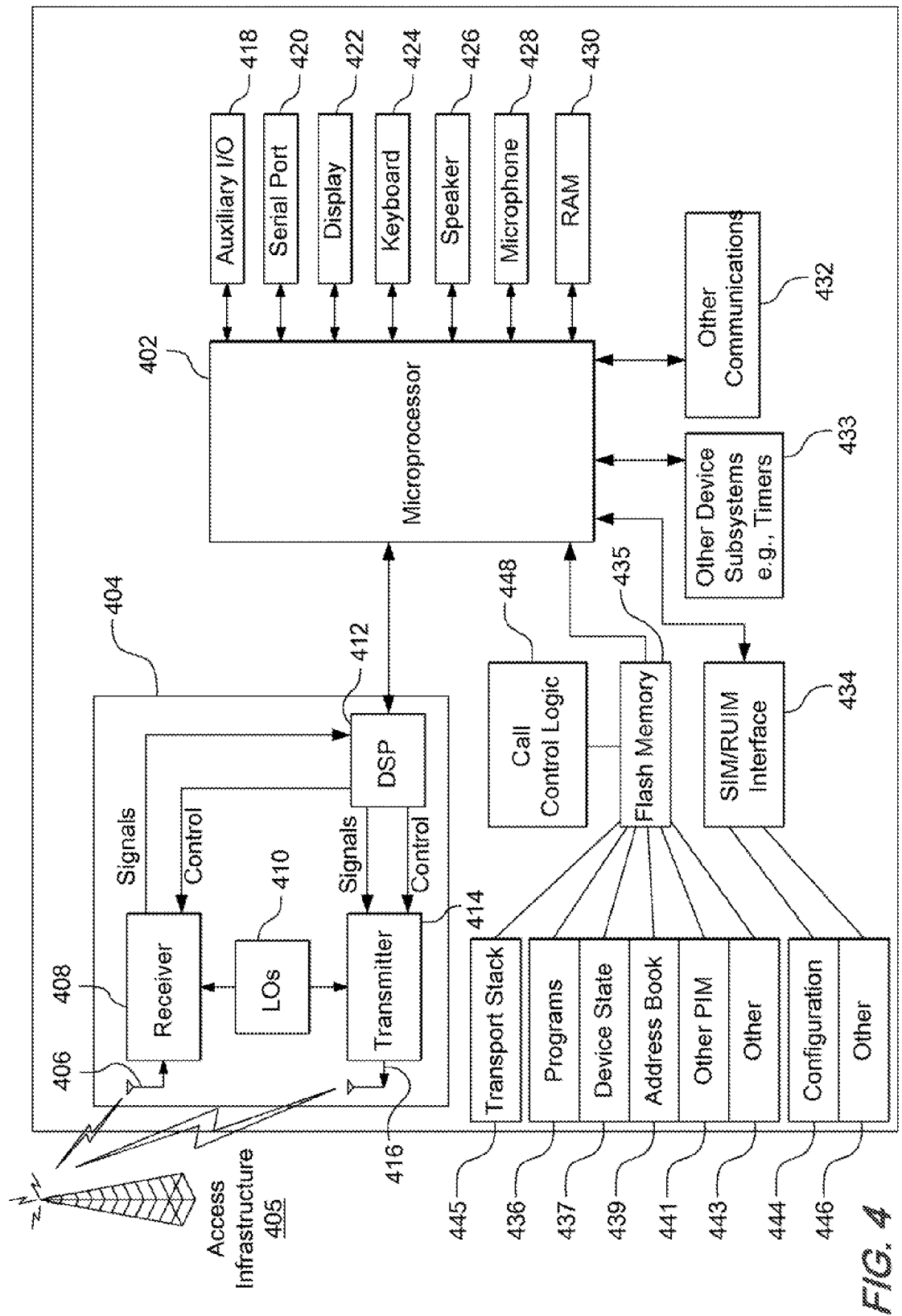
FIG. 4 is a block diagram of an embodiment of a wireless communication device operable with the techniques of the present disclosure.

FIG. 4 depicts a block diagram of an embodiment of a mobile communication device operable as a wireless UE device, e.g., UE 302, for purposes of the present disclosure. It will be recognized by those skilled in the art upon reference hereto that although an embodiment of UE 302 may comprise an arrangement similar to one shown in FIG. 4, there can be a number of variations and modifications, in hardware, software or firmware, with respect to the various modules depicted. Accordingly, the arrangement of FIG. 4 should be taken as illustrative rather than limiting with respect to the embodiments of the present disclosure. A microprocessor 402 providing for the overall control of an embodiment of UE 302 is operably coupled to a communication subsystem 404 that is capable of multi-mode communications (e.g. CS domain, IP domain such as IMS, etc.). The communication subsystem 404 generally includes one or more receivers 408 and one or more transmitters 414 as well as associated components such as one or more local oscillator (LO) modules 410 and a processing module such as a digital signal processor (DSP) 412. As will be apparent to those skilled in the field of communications, the particular design of the communication module 404 may be dependent upon the communications networks with which the mobile device is intended to operate (e.g., a CDMA network, a GSM network, WLAN, etc.). Regardless of the particular design, however, signals received by antenna 406 through appropriate access infrastructure 405 (e.g., cellular base station towers, WLAN hot spots, etc.) are provided to receiver 408, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 412, and provided to transmitter 414 for digital-to-analog (D/A) conversion, frequency up conversion, filtering, amplification and transmission over the air-radio interface via antenna 416.

Microprocessor 402 may also interface with further device subsystems such as auxiliary input/output (I/O) 418, serial port 420, display 422, keyboard/keypad 424, speaker 426, microphone 428, random access memory (RAM) 430, a short-range communications subsystem 432, and any other device subsystems, e.g., timer mechanisms, generally labeled as reference numeral 433. In this example, display 422, keyboard/keypad 424, speaker 426, microphone 428 are part of the user interface of the mobile communication device through which calls may be initiated by and maintained for the end user. To control access, a SIM/RUIM 434 may also be provided in communication with the microprocessor 402. In one implementation, SIM/RUIM interface 434 is operable with a SIM/RUIM card having a number of key configurations 444 and other information 446 such as URIs as well as identification and subscriber-related data. Note that, without a SIM/RUIM, the UE device is referred to as mobile equipment (ME) but techniques of the present disclosure are applicable to either device.

Operating system software and applicable service logic software may be embodied in a persistent storage module (i.e., non-volatile storage) such as Flash memory 435. In one implementation, Flash memory 435 may be segregated into different areas, e.g., storage area for computer programs 436 (e.g., service processing logic), as well as data storage regions such as device state 437, address book 439, other personal information manager (PIM) data 441, and other data storage areas generally labeled as reference numeral 443. A transport stack 445 may be provided to effectuate one or more appropriate radio-packet transport protocols. In addition, a call control logic module 448 is provided for appropriate call message processing according to the present techniques, effectuating SIP-URI and call reference ID generation, validation, verification, and correlation with IMRNs, etc. as set forth hereinabove.

As described above, the first technique pertains to methods and apparatus for originating a Session Initiation Protocol (SIP) call from a user equipment (UE) device in a network environment which includes a circuit-switched (CS) network and an IP multimedia subsystem (IMS) network. When the SIP call is originated from the UE device in the CS network domain, a SIP Invite message which includes a SIP Uniform Resource Indicator (URI) or Tele URI of the called party is sent from the UE device to an application server (AS) node in the IMS network. At the AS node, a pool of E.164 numbers are maintained as IP multimedia routing numbers (IMRNs) which are utilized for mapping to or otherwise associating with called party URIs. Thus, the AS node dynamically-allocates or otherwise selects an E.164 number with respect to the called party's URI received from the UE device, and returns it to the UE device in a SIP 380 (Alternative Service) Response message. Subsequently, the selected E.164 number is sent from the UE device in a call setup message for identification of the URI at the AS node. Thus, the selected E.164 number is utilized for routing the SIP call towards the called party upon interrogating the URI-IMRN mapping, whereupon it may be released back to the pool of IMRNs for future use. Appropriate timers may be provided at the device and AS node endpoints so that it can be verified whether a call reference number associated with the call remains valid (e.g. it has not timed out) or the selected IMRN remains valid (e.g. it has not timed out). Optionally, the released IMRN may be quarantined for a period of time.

At the AS node, the first technique may involve the acts of maintaining access to a pool of E.164 numbers as IP multimedia routing numbers (IMRNs); receiving a SIP Invite message for a SIP call originating from a user equipment (UE) device through a circuit-switched network domain, the SIP Invite message having call information which includes a SIP URI or Tel URI of the called party; selecting one of the E.164 numbers and storing a mapping between the selected E.164 number and the call information; causing a SIP 380 (Alternative Service) Response message to be sent to the UE device in response to receiving the SIP Invite message, the SIP 380 (Alternative Service) message including the selected E.164 number; and after the sending of the SIP 380 (Alternative Service) Response message, receiving a call setup message from the UE device for the SIP call, the call setup message having the selected E.164 number; identifying, with use of the selected E.164 number via the stored mapping, the URI identified from the call setup message; and causing a SIP session to be established with the called party with use of the URI identified via the stored mapping.

In accordance with a second technique of the present disclosure, variable call parameters for SIP calls may be provided for the UE device on a registration-by-registration basis rather than on (or possibly in conjunction with) a call-by-call basis. In one illustrative example, a SIP Register message is sent from a UE device to the IMS network for registration of the UE device. A SIP 200 OK message is received by the UE device from the IMS network in response to sending the SIP Register message. The SIP 200 OK message has one or more variable call parameters or a network address at which to obtain the variable call parameters. The variable call parameters may include an E.164 number which is dynamically-assigned to or otherwise selected for the UE device by the IMS network and a time or timer value which defines a time period for which the E.164 number remains assigned to the UE device. The one or more variable call parameters may be contained within one or more P-Preferred Header fields of the SIP 200 OK message. The E.164 number may be alternatively located in a body of the SIP 200 OK message and encoded in accordance with a Uniform Resource Indicator (URI) format, or an Extensible Markup Language (XML) format. In any event, the variable call parameters are stored in memory of the UE device and utilized for processing each one of a plurality of SIP calls involving the UE device. After registration, the UE device may initialize a timer with the timer value, run the timer and, when processing a SIP call, cause a CS call setup message which includes the E.164 number to be sent to the IMS network for routing of the call if the timer has not yet expired. Otherwise, if the timer has expired, the UE device may retrain from utilizing the E.164 number (now deassigned from the UE device) in the CS call setup message and alternatively obtain and utilize a new E.164 number or an altogether different technique for processing of SIP calls.

Preferably, the variable call parameters further include a data indication which indicates a preferred access domain for use by the mobile communication device (e.g. the preferred access domain may be either the circuit-switched (CS) network or the packet-switched (PS) network). In addition, the variable call parameters further include a data indication which indicates a preferred access technology for use by the mobile communication device. More particularly with reference to a message flow diagram 600A of FIG. 6A associated with the second technique, when an event or condition requiring UE device 302 to register is detected (e.g. switch or power to "ON"), UE device 302 sends a SIP Register message 606 to network node 308 (e.g. an ICCF as per 3GPP TR 23.892, or some other SIP Application Server (AS)). Standard SIP session register procedures 608 then occur in response. A depository or database of a pool of IMRNs (e.g. the E.164 numbers) is maintained at or accessible by network node 308. In response to the SIP Register message 606 or successful registration of UE device 302, network node 308 dynamically assigns or otherwise selects an E.164 number from the database that will be used by UE device 302 for SIP calls. When the standard SIP session register procedures 608 are complete, network node 308 sends UE device 302 a SIP 200 OK message 610 which has the selected E.164 number contained within a P-Preferred header field of the SIP 200 OK message 610. A time or timer value which defines a time period for which the selected E.164 number remains assigned to UE device 302 may also be included in this field or other P-Preferred header field. UE device 302 may then store the data received from the database in either internal memory or external removable memory, for use with each one of a plurality of SIP calls originated from UE device 302. The memory within which the data are stored may be any suitable memory, such as a Compact Flash, a (U)SIM, an R-UIM, an SD memory, a MicroSD, a Memory Stick, etc.

Figure 6A:
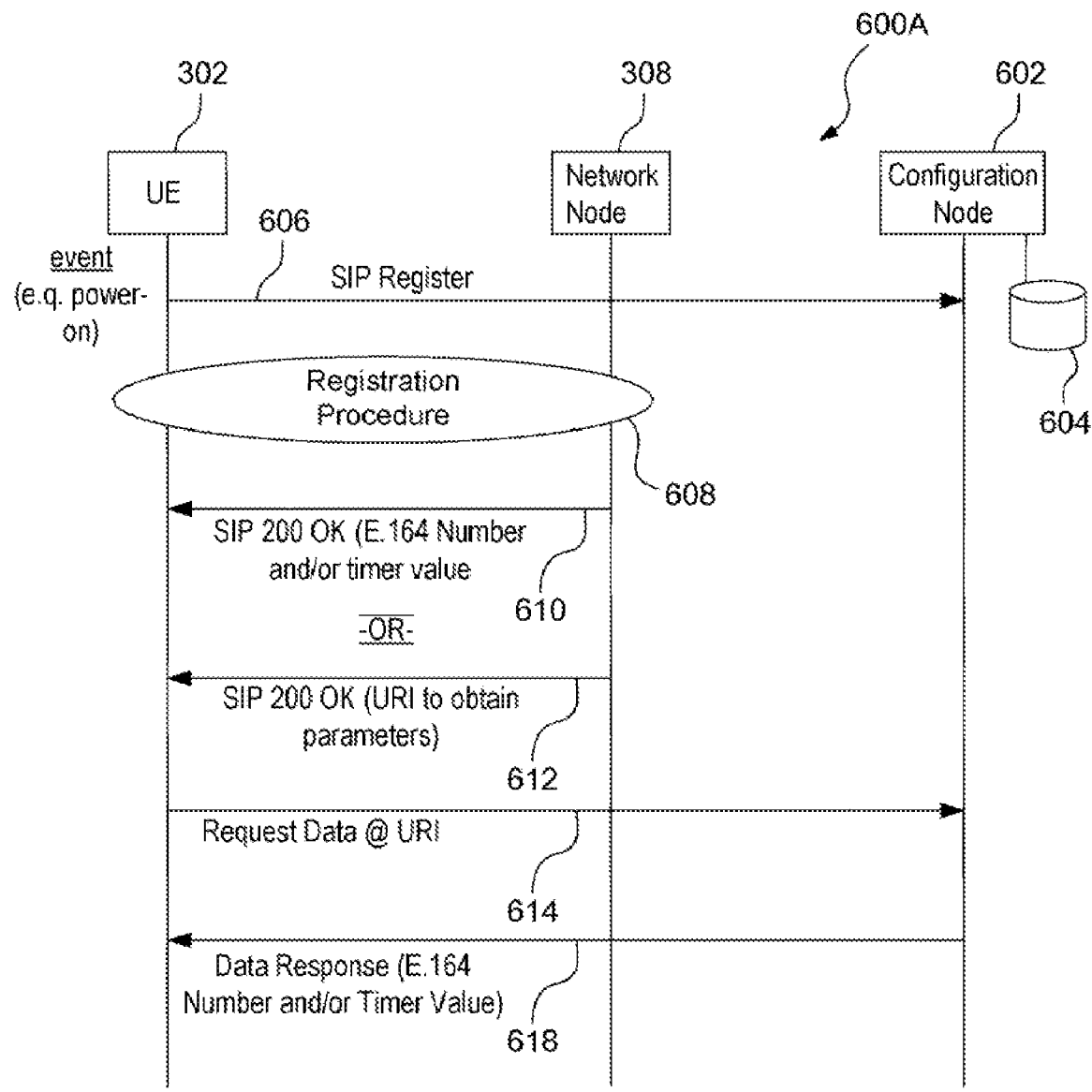
FIGS. 6A and 6B depict exemplary message flow diagrams corresponding to the second technique of FIG. 5, where registration with a SIP Register message causes a SIP 200 OK message to be sent with the variable call parameter or a network address at which to obtain the variable call parameter.

Alternatively with respect to with FIG. 6A, when the standard SIP session register procedures 608 are complete, network node 308 may send UE device 302 a SIP 200 OK message 612 which does not include the E.164 number or timer value, but rather includes a network address (e.g. domain name or Uniform Resource Locator (URL)) for where and how these parameters may be retrieved by UE device 302. Subsequently, UE device 302 sends a data request message 614 to a network ("configuration") node 602 identified by the network address, where a pool of E.164 numbers is maintained in a depository or database 604. Note that configuration node 602 may be the same or different node than network node 308. Data request message 614 may be a hypertext transfer protocol (HTTP) Get message or other suitable message for requesting, obtaining, and/or retrieving the E.164 number. Configuration node 602 may dynamically-assign or otherwise select the E.164 number from database 604 and send it to UE device 302 for use with SIP calls involving UE device 302. The time or timer value which defines the time period for which the selected E.164 number remains assigned to UE device 302 may also be included in this field. UE device 302 may then store the information received from the depository in either internal memory or external removable memory.

The following exemplary code may be included in SIP 200 OK message 612 of the second technique if specifying where and how an E.164 number can be retrieved by UE device 302. It should be understood that this code is provided only as an example and that one of ordinary skill in the art may recognize other ways or syntax for performing the same or similar function.

```
Content-Type: message/external-body;
    ACCESS-TYPE=URL;
URL="http://www.homenetworknode.com/icsdata/privateuserid";
    EXPIRATION="Sat, 20 Jun 2002 12:00:00 GMT";
    size=231
Content-Length: 105
Content-Disposition: CS MO session initiation
Content-ID: <4e5562cd1214427d@homenetworknode.com >
```

In this example, the above-described URL points to database 604 of configuration node 602 where the pool of E.164 numbers are maintained. Preferably, the network address or URL is constructed so that it has some relationship to UE device 302 by incorporating the identification of UE device 302. In this example, the identification is the 'privateuserID' identification of UE device 302. Alternatively, the identification may be an International Mobile Subscriber Identity (IMSI) identification number or a similar user identification number such as, but not limited to, a mobile identification number (MIN), a Personal Identification Number (PIN), an IMSI Private USER identity etc. The time or expiration date informs UE device 302 when the information will expire. The 'size' parameter indicates the size of the data to be retrieved. The 'content-disposition' parameter indicates whether or not the data is for circuit switched (CS) mobile originated session.

Regardless of the manner in which the UE device receives the assigned E.164 number and timer value, the UE device stores these parameters in its memory for use in processing SIP calls. The UE device may store these parameters in its own internal memory or in a removable memory module, such as but not limited to a SIM, a (U)SIM, a Compact Flash, a MicroSD, a Memory Stick, an R-UIM, etc. Preferably, the variable call parameters, which may include but are not limited to the E.164 number, timer value, etc., are formatted in accordance with (U)SIM type coding or Open Mobile Alliance (OMA) Device Management (DM) type coding.

The (U)SIM type coding format may be provided as follows:

| Identifier:' | Structure: transparent | Optional |
|---|---|---|
| SFI: '12' | | |
| File size: 1 byte | Update activity: high | |
| Access Conditions: | | |
| READ | PIN | |
| UPDATE | ADM | |
| DEACTIVATE | ADM | |
| ACTIVATE | ADM | |

| Bytes | Description | M/O | Length |
|---|---|---|---|
| 1 | Time interval | O | 1 byte |

The timer value is coded in integer multiples of n minutes. The range is from n minutes to a maximum value. The value '00' indicates that no timer value is assigned or is infinite. The encoding is:

| '00': | infinite; |
|---|---|
| '01': | n minutes; |
| '02': | 2n minutes; |
| . | . |
| . | . |
| . | . |
| 'YZ': | (16Y + Z)n minutes (maximum value). |

The OMA DM type coding may be provided as follows. The ICS-SI Timer leaf defines the ICS timer—the maximum duration an ICS-PSI will remain valid for in the network.
   Occurrence: One
   Format: chr
   Access Types: Get, Replace
   Values: <The maximum duration an ICS-PSI will remain valid in the network>

The ICS-SI Timer leaf is the maximum duration an ICS-PSI will remain valid in the network. The timer value shall be given in minutes.

EXAMPLE 170 (Minutes)

```
<Node>
    <NodeName> ICS-SI Timer </NodeName>
    <DFProperties>
```

```
        <AccessType>
            <Get/>
            <Replace/>
        </AccessType>
        <DFFormat>
            <int/>
        </DFFormat>
        <Occurrence>
            <One/>
        </Occurrence>
        <Scope>
            <Permanent/>
        </Scope>
        <DFTitle> ICS-SI Timer.</DFTitle>
        <DFType>
            <MIME>text/plain</MIME>
        </DFType>
    </DFProperties>
</Node>
```

When the end user of the UE device decides to make an outgoing call, the UE device sends a SIP Invite message to the network node. The SIP Invite message contains the identification of the UE device (such as its GRUU) and the B party address of the (intended) called party. The UE device also sends an outgoing CS call setup message (e.g. a TS 24.008 SETUP message) which has a destination number field populated with the assigned E.164 number. The CS call setup message from the UE device causes an additional SIP Invite message to be produced in the network (e.g. by the MGCF) and sent to the network node. This additional SIP Invite message includes the assigned E.164 number. When the network node receives the SIP Invite message from the UE device, it correlates it with the additional SIP Invite message from the network based on the stored mapping, the identification of the UE device, and the assigned E.164 number, for further processing of the SIP call. An example of how this information is stored in the network node is provided below:

E.164 number, Timer value
  |
  → Private User Identity received in the registration IMPI, IMSI, MIN
  → Public User Identity Registered IMPU, MSISDN etc
  → Implicit Public User IDs registered
  → Contact address
  → P-GRUU's and T-GRUUs for all these registered IMPU's Here, the E.164 number is used as a reference, and stored against it is a number of parameters as received in SIP Register message 606. Referring back to FIG. 1 for the second technique, AS 114-N of FIG. 1 is preferably provided with appropriate logic/structure/software/firmware module(s), such as CCCF 116, NeDS 118, and gsm SCF 120, for operating as follows. A pool of E.164 numbers are maintained which are operable as IMRNs which terminate at the AS node. A selected E.164 number may be mapped to received information in a SIP Register message from a UE device, information which includes but is not limited to an identification of the UE device (e.g. IMSI, MIN, PIN, etc.). The selected E.164 number is provided to the UE device in a P-Preferred header field of a SIP 200 message which is sent in response to the SIP Register message. When a SIP call is originated from the UE device, in addition to sending a SIP Invite message, the UE device sends a CS call setup message which includes the selected E.164 number. The stored mapping, the assigned E.164 number, and the identification of the UE device are utilized by the AS to properly route the SIP call as described.

Figure 5:
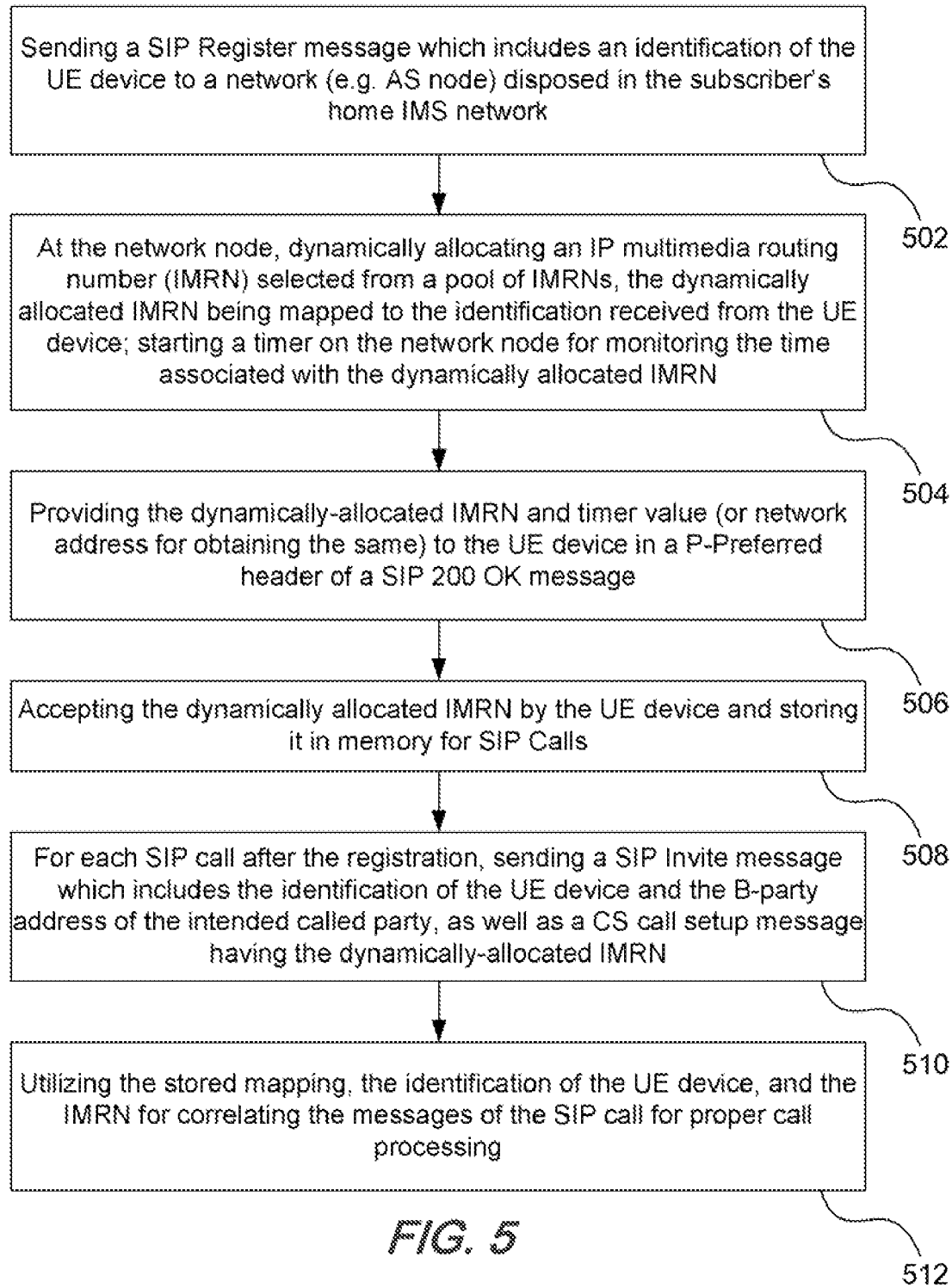
FIG. 5 is a second flowchart associated with a second technique of obtaining, providing, and/or utilizing a variable call parameter suitable for use in originating a SIP call, where the variable call parameter may be obtained and provided on a registration-by-registration basis.

Reference will now be made to FIG. 5 which is a flowchart associated with the second technique of the present disclosure. In this second technique, variable call parameters for SIP calls may be provided for the UE device on a registration-by-registration basis rather than on a call-by-call basis. In step 502 of FIG. 5, a UE device sends a SIP Register message to a network node of the IMS network, where the SIP Register message includes an identification of the UE device. In step 504 of FIG. 5, the network node dynamically-allocates or otherwise identifies an IP multimedia routing number (IMRN) (e.g. the E.164 number) from a pool of IMRNs, and produces a stored mapping of the selected IMRN to the identification of the UE device. An example of a stored mapping is provided below:

---

E.164 number, Timer value
|
   → Private User Identity received in the registration IMPI, IMSI, MIN
   → Public User Identity Registered IMPU, MSISDN etc
   → Implicit Public User IDs registered
   → Contact address
   → P-GRUU's and T-GRUUs for all these registered IMPU's

---

A timer may be initialized with a timer value and started at the network node for monitoring the time period over which the IMRN remains assigned to the UE device (i.e. after timer expiration, the selected IMRN may be deassigned from the UE device and released back into the pool of IMRNs). In step 506 of FIG. 5, the IMRN and/or timer value is provided to the UE device in a P-Preferred header field of a SIP 200 OK message, which is sent in response to the SIP Register message. Alternatively, a network address which identifies the network location at which to obtain the IMRN and/or timer value is provided in the SIP 200 OK message. In step 508 of FIG. 5, the IMRN and/or timer value are received and stored in memory of the UE device. The IMRN and timer value are then utilized for processing each one of a plurality of SIP calls involving the UE device. In step 510 of FIG. 5, for each originated SIP call after the registration, the UE device sends a SIP Invite message which includes the identification of the UE device and the B-party address of the intended called party. The UE device also sends a CS call setup message which includes the dynamically-allocated IMRN. In step 512 of FIG. 5, the network node utilizes the stored mapping, the identification of the UE device, and the IMRN for correlating the messages of the SIP call for proper call processing. An example of a stored mapping is provided below:

---

E.164 number, Timer value
|
   → Private User Identity received in the registration IMPI, IMSI, MIN
   → Public User Identity Registered IMPU, MSISDN etc
   → Implicit Public User IDs registered
   → Contact address
   → P-GRUU's and T-GRUUs for all these registered IMPU's

---

Figure 6B:
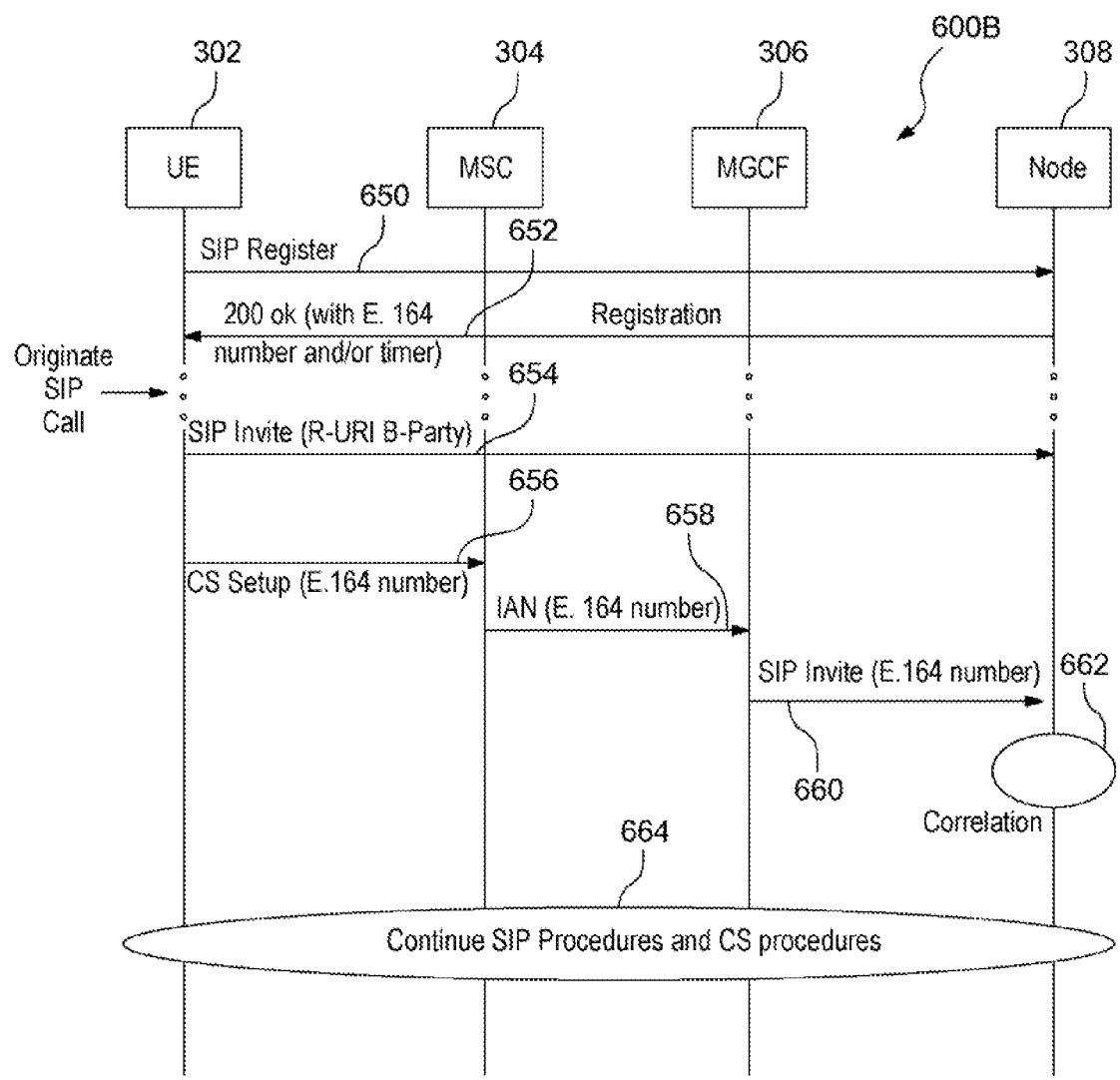

Reference is now made to a message flow diagram 600B of FIG. 6B associated with the second technique. When an event or condition requiring UE device 302 to register is detected (e.g. switch or power to "ON"), UE device 302 sends a SIP Register message 650 to network node 308. Standard SIP session register procedures then occur in response. A depository or database of a pool of IMRNs (e.g. the E.164 numbers) is maintained at or accessible by network node 308. In response to the SIP Register message 650 or successful registration of UE device 302, network node 308 dynamically assigns or otherwise selects an E.164 number from the database that will be used by UE device 302 for SIP calls. Note that a characteristic of the E.164 number is that it is possible to determine by examination which UE device (e.g. ME+Public User ID) was requesting a session. Note further that the E.164 number may be generated by at least one of (but not limited to) the following mechanisms: (a) dynamically assigned such that the numbers are allocated sequentially; (b) selected from the pool in a random fashion; (c) allocated from the pool in some sequential order; (d) constructed with use of an algorithm having some relationship(s) to one or more of the parameters received in a message (e.g. the SIP Register message, the SIP Invite message, etc.) from the UE device.

When the standard SIP session register procedures are complete, network node 308 sends UE device 302 a SIP 200 OK message 652 which has the selected E.164 number contained within it. A time or timer value which defines a time period for which the selected E.164 number remains assigned to UE device 302 may also be included. These one or more parameters may be contained within one or more P-Preferred Header fields of the SIP 200 OK message. Alternatively, when the standard SIP session register procedures are complete, network node 308 may send UE device 302 a SIP 200 OK message 652 which does not include the E.164 number or timer value, but rather includes a network address (e.g. domain name or Uniform Resource Locator (URL)) for where and how these parameters may be retrieved by UE device 302 (as previously described in relation to FIG. 6A). In specific embodiments, the one or more parameters may be located in a body of the SIP 200 OK message and encoded in accordance with Uniform Resource Indicator (URI) format, or an Extensible Markup Language (XML) format. UE device 302 may then store the data received from the database in either internal memory or external removable memory, for use with each one of a plurality of SIP calls originated from UE device 302. Preferably, the variable call parameters further include a data indication which indicates a preferred access domain for use by the mobile communication device (e.g. the preferred access domain may be either the circuit-switched (CS) network or the packet-switched (PS) network). In addition, the variable call parameters further include a data indication which indicates a preferred access technology for use by the mobile communication device.

For each SIP call after the registration, when the end user of the UE device decides to make an outgoing call, the UE device sends a SIP Invite message 654 to the network node. The SIP Invite message contains the identification of the UE device and the B party address of the (intended) called party, as well as other information for completing the session. The UE device also sends an outgoing CS call setup message 656 (e.g. a TS 24.008 SETUP message) which has a destination number field populated with the assigned E.164 number. The CS call setup message from the UE device causes MSC 304 to produce an Initial Address Message (IAM) 658 having the assigned E.164 number, which is sent to MGCF 306. Upon receipt of IAM 658 by MGCF 306, the MGCF produces an additional SIP Invite message 660 which includes the assigned E.164 number and sends it to network node 308.

When network node 308 receives SIP Invite message 654 from UE device 302, it correlates 662 it with the additional SIP Invite message 660 from MGCF 306 based on the stored mapping, the identification of the UE device, and the assigned E.164 number, for further processing of the SIP call. Standard SIP procedures and CS procedures 664 may thereafter be utilized to carry out processing of the call. Below is an example of the mapping used to correlate the two (2) SIP Invite messages:

---

E.164 number, Timer value
|
   → Private User Identity received in the registration IMPI, IMSI, MIN
   → Public User Identity Registered IMPU, MSISDN etc
   → Implicit Public User IDs registered
   → Contact address
   → P-GRUU's and T-GRUUs for all these registered IMPU's

---

Note that, after assignment of the E.164 number to the UE device, the network node and/or UE device initializes a timer with the timer value and runs the timer. If the timer expires, the E.164 number becomes deassigned from the UE device for SIP calls. In this situation, the UE device may operate to register again and/or send a SIP re-Register message for re-registration in order to receive a corresponding SIP 200 OK message having the newly-received E.164 number and (optionally) the timer value. Thus, an updated variable call parameter may be utilized and/or received in response to the timer expiration. The newly-received E.164 number may be the same E.164 number as the previous one or, alternatively, a different E.164 number.

If the UE device fails to have an E.164 number assigned to it for the SIP calls after the registration (e.g. the SIP 200 OK message fails to include such parameter), the UE device may operate to perform one or more of the following procedures:

(1) Immediately send a SIP re-Register message to the IMS network, in attempt to receive a SIP 200 OK message having the E.164 number. This may be repeated a number of times until the E.164 number is actually received;

(2) Immediately cause the first technique of the present disclosure to be performed. Again, in the first technique, the UE device causes a SIP Invite message with call information associated with the SIP call to be sent to the IMS network, where the SIP Invite message include the URI of the called party. A SIP 380 (Alternative Service) Response message is received from the IMS network in response to sending the SIP Invite message, where the SIP 380 (Alternative Service) Response message includes the E.164 number. After receiving the SIP 380 (Alternative Service) Response message, the UE device causes a CS call setup message to be sent to the IMS network for the SIP call, where the CS call setup message includes the E.164 number for use in routing the SIP call;

(3) Identify a provisioned E.164 number if available; and (4) Perform a predetermined algorithm to obtain the E.164 number based on the IMSI; e.g. take 10 digits of the IMSI and append to the country code and area code provisioned in the UE device.

On the other hand, if a time or timer value corresponding to a time period for which the E.164 number for SIP calls remains assigned to the UE device is not received within the SIP 200 OK message, the UE device may identify in its memory (1) a current timer value which was previously received from the network; (2) a default timer value which is standard for all UE devices; (3) a provisioned timer value. The UE device may then proceed to operate using such alternative timer value. Note that, for (3) above, the timer value may be provisioned in a number of ways including, but not limited to: (a) via a 200 OK message per earlier description; (b) Multicast Broadcast Multimedia Service (MBMS); (c) Short Message Service (SMS); (d) Unstructured Supplementary Service Data (USSD); (e) Proprietary Over-The-Air (OTA) mechanism utilized for (U)SIMs today; (f) OMA DM; and (g) XML Configuration Access Protocol (XCAP). Using the second technique, it is further noted that the timer for a given E.164 number at the network node may expire just prior to receipt of SIP Invite messages from the UE device associated with the E.164 number. One approach for solving this problem is to employ a first timer value at the UE device and a second timer value at the network node that is slightly longer than the first timer value (e.g. by a predetermined value). In a specific embodiment, the network or network node may add a predetermined offset value to the timer value or, alternatively, the UE device may subtract a predetermined offset value to the timer value received from the network. Another approach to solving this problem is for the network node to return a newly-assigned E.164 number to the UE device in response to its timer expiration or detection of the condition, causing the UE device to abort its call processing and retry the call setup request with the newly-assigned E.164 number. Alternatively, the network node may be left not to make any correlation of the SIP Invite messages as a result of the deassigned E.164 number, so that the UE device has to abort its call processing due to the lack of network response and retry the call setup request with a newly-assigned E.164 number (e.g. the UE device re-registers prior to the retry to obtain the newly-assigned E.164 number, or the network node forwards the newly-assigned E.164 number).

Note that the UE device is further adapted to handle two or more SIP calls concurrently using the techniques of the present disclosure. To do this, the UE device may employ the first technique of the present disclosure for each SIP call as many times as needed and/or possible. Alternatively, the UE device may employ the second technique of the present disclosure for processing the first SIP call and subsequently employ the first technique for processing of the second SIP call as well as any other subsequent SIP calls.

Thus, methods and apparatus for use in processing Session Initiation Protocol (SIP) calls in a network environment which includes a circuit-switched (CS) network and an Internet Protocol (IP) multimedia subsystem (IMS) network have been described. In a mobile device method of the second technique, as an illustrative example, a SIP Register message is sent from the mobile device to the IMS network for registration of the mobile device. A SIP 200 OK message is received by the mobile device from the IMS network in response to sending the SIP Register message. The SIP 200 OK message has data included in its P-Preferred header field, and these data may be one or more variable call parameters or a network address at which to obtain the variable call parameters. The variable call parameters may include an E.164 number which is dynamically assigned to the mobile device by the IMS network, and/or a time or timer value which defines a time period for which the E.164 number remains assigned to the mobile device. The variable call parameters are stored in memory of the mobile device and utilized for processing each one of a plurality of SIP calls involving the mobile device. After registration, the mobile device may initialize a timer with the timer value, run the timer and, when processing a SIP call, cause a CS call setup message which includes the E.164 number to be sent, to the IMS network for routing of the call if the timer has not yet expired. If the timer has expired, the mobile device may refrain from utilizing the deassigned E.164 number in the CS call setup message and alternatively obtain and utilize a new E.164 number or an altogether different technique for processing of the SIP call.

A network node method of the second technique involves, in one illustrative example, maintaining access to a pool of E.164 numbers; receiving a SIP Register message from a mobile communication device through the CS network for registration; selecting one of the E.164 numbers from the pool and storing a mapping between an identification of the mobile communication device and the selected E.164 number; causing a SIP 200 OK message to be produced and sent to the mobile communication device in response to receiving the SIP Register message, the SIP 200 OK message having a P-Preferred header field which includes one of the selected E.164 number and a network address at which to obtain the selected E.164 number; and for each one of a plurality of SIP calls involving the mobile communication device after the registration, utilizing the selected E.164 number in processing of the SIP call. The processing of the SIP call may involve the receiving of a SIP Invite message for the SIP call from the mobile communication device, the SIP Invite message including the identification of the mobile communication device; receiving an additional SIP Invite message for the SIP call based on a CS call setup message sent from the mobile communication device, the additional SIP Invite message having the selected E.164 number; correlating the SIP Invite message and the additional SIP Invite message based on the identification of the mobile communication device, the selected E.164 number, and the stored mapping; and causing the SIP call to be established based on the correlation between the SIP Invite message and the additional SIP Invite message.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method for use in processing calls in a network environment which includes a circuit-switched (CS) network and an Internet Protocol (IP) multimedia subsystem (IMS) network, the method comprising the acts of:
   sending a SIP message from a mobile communication device to the IMS network;
   receiving a SIP 200 OK message from the IMS network in response to sending the SIP message to the IMS network, the SIP 200 OK message having data comprising one of at least one variable call parameter and a network address at which to obtain the at least one variable call parameter, wherein the at least one variable call parameter includes a routable number that terminates to a network node disposed in the IMS network;
   utilizing the at least one variable call parameter in processing of a CS call;
   if the mobile communication device fails to have the routable number assigned to said mobile communication device for the CS calls after registration:
   sending a SIP re-Register message to the IMS network; and
   receiving a SIP 200 OK message from the IMS network in response to sending the SIP re-Register message to the IMS network, the SIP 200 OK message having the routable number in a P-Preferred-Identity header field of the SIP 200 OK message.

2. The method of claim 1, wherein the routable number comprises an E.164 number.

3. The method of claim 1, wherein the routable number comprises an E.164 number encoded in Extensible Markup Language (XML) format.

4. The method of claim 1, wherein the routable number comprises an E.164 number which is encoded in accordance with a Uniform Resource Indicator (URI) format.

5. The method of claim 1, wherein the routable number comprises an E.164 number which is encoded in accordance with a Uniform Resource Indicator (URI) format or an Extensible Markup Language (XML) format, and contained in a body of the SIP 200 OK message.

6. The method of claim 1, wherein the at least one variable call parameter further comprises an indication which indicates a preferred access domain for use by the mobile communication device, the preferred access domain comprising one of the circuit-switched (CS) network and a packet-switched (PS) network.

7. The method of claim 1, wherein the at least one variable call parameter further comprises an indication which indicates a preferred access technology for use by the mobile communication device.

8. The method of claim 1, wherein the at least one variable call parameter further comprises an indication which indicates a preferred access technology for use by the mobile communication device which is located in a body of the SIP 200 OK message and encoded in Extensible Markup Language (XML) format.

9. The method of claim 1, wherein the at least one variable call parameter further comprises a time or timer value which defines a time period for which the routable number for the CS call remains assigned to the mobile communication device.

10. The method of claim 1, wherein the routable number comprises an E.164 number which is dynamically assigned to the mobile communication device by the IMS network and further wherein the at least one variable call parameter includes a time or timer value which defines a time period for which the E.164 number for the CS call remains assigned to the mobile communication device.

11. The method of claim 1, wherein the data includes the network address at which to obtain the at least one variable call parameter, the method comprising the further acts of:
    sending a request message to the network address for obtaining the at least one variable call parameter; and
    receiving the at least one variable call parameter in response to sending the request message.

12. The method of claim 1, wherein the routable number comprises an E.164 number and the CS call is originated in the CS network by the mobile communication device towards a called party, the method further comprising:
    causing a CS call setup message to be sent to the IMS network, the CS call setup message including the E.164 number for use in routing the CS call.

13. The method of claim 1, wherein the at least one variable call parameter further comprises a time or timer value which defines a time period for which the routable number for the CS call remains assigned to the mobile communication device, and wherein the act of utilizing the at least one variable call parameter in processing of the CS call comprises the further acts of:
    initializing the timer with the timer value and running the timer;
    if the timer has not yet expired: causing a CS call setup message to be sent to the IMS network, the CS call setup message including the routable number for use in routing the CS call; and if the timer has expired: refraining from utilizing the routable number which has been deassigned from the mobile communication device.

14. The method of claim 1, wherein the at least one variable call parameter further comprises a time or timer value which defines a time period for which the routable number remains assigned to the mobile communication device for the CS call, and wherein the act of utilizing the at least one variable call parameter in processing of the CS call comprises the further acts of:
   initializing the timer with the timer value and running the timer;
   if the timer has not yet expired: causing a CS call setup message to be sent to the IMS network, the CS call setup message including the routable number for use in routing the CS call; and
   if the timer has expired: receiving at least one updated variable call parameter from the IMS network.

15. The method of claim 1, further comprising:
   if a timer corresponding to a time period for which the routable number remains assigned to the mobile communication device is not received within the SIP 200 OK message:
      identifying, in the memory, a default timer corresponding to a time period for which the routable number for the CS call remains assigned to the mobile communication device.

16. The method of claim 1, further comprising storing the at least one variable call parameter in accordance with (U)SIM type coding.

17. The method of claim 1, further comprising storing the at least one variable call parameter in accordance with Open Mobile Alliance (OMA) Device Management (DM) type coding.

18. A mobile communication device operable in a network environment which includes a circuit-switched (CS) network and an Internet Protocol (IP) multimedia subsystem (IMS) network, the mobile communication device comprising:
   one or more processors;
   memory coupled to the one or more processors;
   a wireless transceiver coupled to the one or more processors;
   the wireless transceiver being adapted for communications via the CS network;
   the one or more processors being adapted to:
      cause a SIP message to be sent to the IMS network, via the wireless transceiver;
      receive, via the wireless transceiver, a SIP 200 OK message from the IMS network in response to sending the SIP message to the IMS network, the SIP 200 OK message having data comprising one of at least one variable call parameter and a network address at which to obtain the at least one variable call parameter, wherein the at least one variable call parameter includes a routable number that terminates to a network node disposed in the IMS network; and
      utilizing the at least one variable call parameter in processing of a CS call;
   wherein the one or more processors are further adapted to perform the following acts if the mobile communication device fails to have a routable number assigned to said mobile communication device for the CS calls after registration:
      send a SIP re-Register message to the IMS network; and
      receive a SIP 200 OK message from the IMS network in response to sending the SIP re-Register message to the IMS network, the SIP 200 OK message having the routable number in a P-Preferred-Identity header field of the SIP 200 OK message.

19. The mobile communication device of claim 18, wherein the routable number comprises an E.164 number in an Extensible Markup Language (XML) format.

20. The mobile communication device of claim 18, wherein the at least one variable call parameter further comprises a time or timer value which defines a time period for which the routable number for the CS call remains assigned to the mobile communication device.

21. The mobile communication device of claim 18, wherein the at least one variable call parameter further comprises a time or timer value which defines a time period for which the routable number for the CS call remains assigned to the mobile communication device, the time or timer value being located in a body of the SIP 200 OK message in an Extensible Markup Language (XML) format.

22. The mobile communication device of claim 18, wherein the routable number comprises an E.164 number which is dynamically assigned to the mobile communication device by the IMS network and further wherein the at least one variable call parameter includes a time or timer value which defines a time period for which the E.164 number remains assigned to the mobile communication device.

23. The mobile communication device of claim 18, wherein the routable number comprises an E.164 number and the CS call is originated in the CS network by the mobile communication device towards a called party, the one or more processors being further adapted to:
   cause a CS call setup message to be sent to the IMS network for the CS call, the CS call setup message including the E.164 number for use in routing the CS call.

24. The mobile communication device of claim 18, wherein the at least one variable call parameter further comprises a time or timer value which defines a time period for which the routable number remains assigned to the mobile communication device for the CS calls, the one or more processors being adapted to utilize the at least one variable call parameter in processing of the CS call by being further adapted to:
   initialize the timer with the timer value and run the timer;
   if the timer has not yet expired: cause a CS call setup message to be sent to the IMS network, the CS call setup message including the routable number for use in routing the CS call; and
   if the timer has expired: refrain from utilizing the routable number which has been deassigned from the mobile communication device.

25. The mobile communication device of claim 18, wherein the at least one variable call parameter further comprises a time or timer value which defines a time period for which the routable number remains assigned to the mobile communication device for the CS calls, and the one or more processors are adapted to utilize the at least one variable call parameter in processing of the CS call by being further adapted to:
   initialize the timer with the timer value and run the timer;
   if the timer has not yet expired: cause a CS call setup message to be sent to the IMS network, the CS call setup message including the routable number for use in routing the CS call; and
   if the timer has expired: receive at least one updated variable call parameter from the IMS network.

26. The mobile communication device of claim 18, further comprising:
  if a timer corresponding to a time period for which the routable number remains assigned to the mobile communication device is not received within the SIP 200 OK message:
    identifying, in the memory, a default timer corresponding to a time period for which the routable number E.164 number for the CS call remains assigned to the mobile communication device.

27. The mobile communication device of claim 18, wherein the one or more processors are adapted to store the at least one variable call parameter in accordance with (U)SIM type coding.

28. The mobile communication device of claim 18, wherein the one or more processors are adapted to store the at least one variable call parameter in accordance with Open Mobile Alliance (OMA) Device Management (DM) type coding.

29. A method for effectuating calls in a network environment which includes a circuit-switched (CS) network and an Internet Protocol (IP) multimedia subsystem (IMS) network, the method comprising the acts of:
  receiving a SIP message from a mobile communication device;
  mapping a relationship between an identification of the mobile communication device and an E.164 number;
  causing a SIP 200 OK message to be produced and sent to the mobile communication device in response to receiving the SIP message, the SIP 200 OK message having one of the E.164 number and a network address at which to obtain the E.164 number, wherein the E.164 number is operable as a routable number that terminates to a network node disposed in the IMS network; and
  utilizing the E.164 number in processing of a CS call from the mobile communication device, wherein the SIP 200 OK message further includes one of a timer value which defines a time period for which the E.164 number remains assigned to the mobile communication device and a network address at which to obtain the timer value.

30. The method of claim 29, further comprising the acts of:
  initializing a timer with the timer value and running the timer; and
  if the timer has expired: deassigning the E.164 number from the mobile communication device.

31. The method of claim 30, further comprising:
  adding an offset value to the timer value prior to initializing and running the timer.

32. The method of claim 29, wherein the CS call is originated in the CS network by the mobile communication device towards a called party, the method further comprising:
  receiving an additional SIP Invite message based on a CS call setup message sent from the mobile communication device, the additional SIP Invite message having the E.164 number.

33. The method of claim 29, wherein the CS call is originated in the CS network by the mobile communication device towards a called party, the method further comprising:
  receiving a SIP Invite message from the mobile communication device, the SIP Invite message including the identification of the mobile communication device;
  receiving an additional SIP Invite message based on a CS call setup message sent from the mobile communication device, the additional SIP Invite message having the E.164 number;
  correlating the SIP Invite message and the additional SIP Invite message based on the identification of the mobile communication device, the E.164 number, and the mapping; and
  causing the CS call to be established based on the correlation between the SIP Invite message and the additional SIP Invite message.

34. An application server (AS) node for use in an Internet Protocol (IP) multimedia subsystem (IMS) network for effectuating calls in a network environment including a circuit-switched (CS) network, the AS node comprising one or more processors which are adapted to: process a Session Initiation Protocol (SIP) message received from a mobile communication device; map a relationship between an identification of the mobile communication device and an E.164 number; cause a SIP 200 OK message to be produced and sent to the mobile communication device in response to receiving the SIP message, the SIP 200 OK message having data comprising one of the E.164 number and a network address at which to obtain the E.164 number, wherein the E.164 number is operable as a routable number that terminates to a network node disposed in the IMS network; and utilize the E.164 number in processing of a CS call from the mobile communication device, wherein the SIP 200 OK message further includes one of a timer value which defines a time period for which the E.164 number remains assigned to the mobile communication device and a network address at which to obtain the timer value.

35. The AS node of claim 34, wherein the one or more processors being further adapted to:
  initialize a timer with the timer value and run the timer; and
  if the timer has expired: deassign the E.164 number from the mobile communication device.

36. The AS node of claim 34, wherein the CS call is originated in the CS network by the mobile communication device towards a called party, the one or more processors being further adapted to process the CS call by receiving an additional Invite message based on a CS call setup message sent from the mobile communication device, the additional SIP Invite message having the E.164 number.

37. The AS node of claim 34, wherein the CS call is originated in the CS network by the mobile communication device towards a called party, the one or more processors being further adapted to process the CS call by being further adapted to:
  receive a SIP Invite message from the mobile communication device, the SIP Invite message including the identification of the mobile communication device;
  receive an additional SIP Invite message based on a CS call setup message sent from the mobile communication device, the additional SIP Invite message having the E.164 number;
  correlate the SIP Invite message and the additional SIP Invite message based on the identification of the mobile communication device, the E.164 number, and the mapping; and
  cause the CS call to be established based on the correlation between the SIP Invite message and the additional SIP Invite message.

38. A method for use in processing calls in a network environment which includes a circuit-switched (CS) network and an Internet Protocol (IP) multimedia subsystem (IMS) network, the method comprising the acts of:
  sending a SIP message from a mobile communication device to the IMS network;
  receiving a SIP 200 OK message from the IMS network in response to sending the SIP message to the IMS network, the SIP 200 OK message having data comprising one of at least one variable call parameter and a network address at which to obtain the at least one variable call parameter, wherein the at least one variable call parameter includes a routable number that terminates to a network node disposed in the IMS network;

utilizing the at least one variable call parameter in processing of a CS call;

if the mobile communication device fails to have a routable number assigned to said mobile communication device for the CS calls after registration:

sending a SIP Invite message with call information associated with the CS call to the IMS network, the SIP Invite message including the URI of the called party;

receiving a SIP 380 (Alternative Service) Response message from the IMS network in response to sending the SIP Invite message, the SIP 380 (Alternative Service) Response message including the routable number; and after receiving the SIP 380 (Alternative Service) Response message, causing a CS call setup message to be sent to the IMS network for the CS call, the CS call setup message including the routable number for use in routing the CS call.

39. A mobile communication device operable in a network environment which includes a circuit-switched (CS) network and an Internet Protocol (IP) multimedia subsystem (IMS) network, the mobile communication device comprising:

one or more processors;

memory coupled to the one or more processors;

a wireless transceiver coupled to the one or more processors;

the wireless transceiver being adapted for communications via the CS network;

the one or more processors being adapted to:
cause a SIP message to be sent to the IMS network, via the wireless transceiver;

receive, via the wireless transceiver, a SIP 200 OK message from the IMS network in response to sending the SIP message to the IMS network, the SIP 200 OK message having data comprising one of at least one variable call parameter and a network address at which to obtain the at least one variable call parameter, wherein the at least one variable call parameter includes a routable number that terminates to a network node disposed in the IMS network;

utilizing the at least one variable call parameter in processing of a CS call; and wherein the one or more processors are further adapted to perform the following acts if the mobile communication device fails to have a routable number assigned to said mobile communication device for the CS calls after registration:

cause a SIP Invite message with call information associated with the CS call to be sent to the IMS network, the SIP Invite message including the URI of the called party;

receive a SIP 380 (Alternative Service) Response message from the IMS network in response to sending the SIP Invite message, the SIP 380 (Alternative Service) Response message including the routable number; and after receiving the SIP 380 (Alternative Service) Response message, cause a CS call setup message to be sent to the IMS network for the CS call, the CS call setup message including the routable number for use in routing the CS call.

* * * * *